US012155727B1

(12) United States Patent
Ghazaleh

(10) Patent No.: US 12,155,727 B1
(45) Date of Patent: Nov. 26, 2024

(54) ARCHITECTURE FOR EXECUTION OF COMPUTER PROGRAMS INSIDE DATA SYSTEMS

(71) Applicant: SAS Institute Inc., Cary, NC (US)

(72) Inventor: David Abu Ghazaleh, Holly Springs, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/665,001

(22) Filed: May 15, 2024

Related U.S. Application Data

(60) Provisional application No. 63/557,582, filed on Feb. 25, 2024.

(51) Int. Cl.
| | |
|---|---|
| *G06F 15/173* | (2006.01) |
| *G06F 16/11* | (2019.01) |
| *G06F 16/178* | (2019.01) |
| *H04L 67/12* | (2022.01) |

(52) U.S. Cl.
CPC ............ *H04L 67/12* (2013.01); *G06F 16/116* (2019.01); *G06F 16/1794* (2019.01)

(58) Field of Classification Search
CPC ..... H04L 67/12; G06F 16/1794; G06F 16/116
USPC ........................................................ 709/224
See application file for complete search history.

(56) References Cited

U.S. PATENT DOCUMENTS

| | | | | |
|---|---|---|---|---|
| 7,650,331 B1 * | 1/2010 | Dean | ........................ | G06F 9/544 712/203 |
| 7,756,919 B1 * | 7/2010 | Dean | ..................... | G06F 9/4881 709/201 |
| 9,128,991 B2 | 9/2015 | Shamlin et al. | | |
| 10,803,023 B2 | 10/2020 | Ghazaleh | | |
| 10,803,024 B2 | 10/2020 | Ghazaleh | | |
| 11,042,549 B2 * | 6/2021 | Ghazaleh | .......... | G06F 16/24554 |
| 2005/0188364 A1 | 8/2005 | Cockx et al. | | |
| 2008/0301256 A1 | 12/2008 | McWilliams et al. | | |
| 2011/0093837 A1 | 4/2011 | Guenthner et al. | | |
| 2013/0166601 A1 | 6/2013 | Chrapko et al. | | |
| 2014/0279074 A1 | 9/2014 | Chen et al. | | |
| 2015/0312335 A1 | 10/2015 | Ying et al. | | |
| 2016/0092545 A1 | 3/2016 | Shivarudraiah et al. | | |

(Continued)

OTHER PUBLICATIONS

Ghazaleh, D., "Exploring SAS Embedded Process Technologies on Hadoop", Proceedings of the SAS Global Forum 2016 Conference, SAS5060-2016, Jan. 1, 2016, pp. 1-17, SAS.

(Continued)

*Primary Examiner* — Alicia Baturay
(74) *Attorney, Agent, or Firm* — COATS & BENNETT, PLLC

(57) ABSTRACT

A computing system is configured to receive, at a service entity, from a data exchange entity, an execution command indicating to store an instance of a data program in a memory portion of the computing system by storing computer instructions based on an external data program of an external computing system. The computing system is configured to receive, at a service entity, from a data exchange entity, an indication of availability of the input data. The input data is available for use by the instance of the data program. The computing system is configured to send from the service entity an indication of availability of the output data. The output data is generated based on execution of the instance of the data program.

33 Claims, 26 Drawing Sheets

(56) References Cited

U.S. PATENT DOCUMENTS

2016/0098472 A1   4/2016   Appleton
2017/0004015 A1   1/2017   Raja et al.
2020/0327130 A1   10/2020  Ghazaleh

OTHER PUBLICATIONS

Secosky, J. et al., "Parallel Data Preparation with the DS2 Programming Language", Proceedings of the SAS Global Forum 2014 Conference, SAS329-2014, Jan. 1, 2014, pp. 1-11, SAS.

Ray, R. et al., "Data Analysis with User-Written DS2 Packages", Proceedings of the SAS Global Forum 2016 Conference, SAS6462-2016, Jan. 1, 2016, pp. 1-11, SAS.

Apache Spark, "Spark Configuration", Jan. 1, 2019, pp. 1-20, retrieved on Jul. 23, 2019, retrieved from internet: https://spark.apache.org/docs/latest/configuration.html.

Ghazaleh, D., "Understanding SAS Embedded Process with Hadoop Security", Conference Proceedings: SAS Global Forum 2017, SAS751-2017, Jan. 1, 2017, pp. 1-16, SAS.

Ghazaleh, D., "Execution of User-Written DS2 programs inside Apache Spark using SAS In-Database Code Accelerator", Proceedings of the SAS Global Forum 2019 Conference, SAS3116-2019, Jan. 1, 2019, pp. 1-18, SAS.

Ghazaleh, D., "Achieving Optimal Performance with the SAS Data Connector Accelerator for Hadoop", SAS Global Forum 2020, SAS4497-2020, Jan. 1, 2020, pp. 1-17, SAS.

\* cited by examiner

```
options dsaccel='any';
data dblib.sampleTableOut;
    set dblib.sampletable1;

format marital2 c3 $8.;
    format frequent2 8.1;
    drop c2;

if marital = 0 then
        marital2 = 'single';
    else if marital = 1 then
        marital2 = 'married';
    else
        marital2 = 'unknown';

c3 = trim(c2);
    frequent2 = frequent;
    frequent3 = frequent;
run;
```

FIG. 20A

```
+----------+-------------+
| Column   | Type        |
+----------+-------------+
| c2       | varchar(32) |
| frequent | double      |
| marital  | double      |
+----------+-------------+
```

FIG. 20B

```
+----------+---------------+
| Column   | Type          |
+----------+---------------+
| frequent | double        |
| marital  | double        |
| marital2 | char(8)       |
| c3       | char(8)       |
| frequent2| decimal(8,1)  |
| frequent3| double        |
+----------+---------------+
```

FIG. 20C

```
CREATE FUNCTION sasDataStepFunction123(c2        varchar(32),
                                      frequent  DOUBLE,
                                      marital   DOUBLE)
    RETURNS TABLE (marital2 CHAR(8),
                   c3       CHAR(8),
                   frequent2 DOUBLE,
                   frequent3 DOUBLE) USING
SAS_EMBEDDED_PROCESS_LIBRARY
```

FIG. 21A

```
{
  "checksum": 95348,
  "databaseName": "sampledb",
  "functionName": "sasDataStepFunction123",
  "inputVariables": [
    {
      "name": "c2",
      "charLength": 32,
      "length": 128,
      "sqlType": 28
    },
    {
      "name": "frequent",
      "length": 8,
      "sqlType": 7
    },
    {
      "name": "marital",
      "length": 8,
      "sqlType": 7
    }
  ],
  "localeName": "en_US",
  "metaTableName": "sasepv5",
  "outputVariables": [
    {
      "name": "marital2",
      "charLength": 8,
      "length": 8,
      "sqlType": 26
    },
```

FIG. 21B

```
{
    "name": "c3",
    "charLength": 8,
    "length": 8,
    "sqlType": 26
  },
  {
    "name": "frequent2",
    "length": 8,
    "sqlType": 7
  },
  {
    "name": "frequent3",
    "length": 8,
    "sqlType": 7
  }
],
"program": " format marital2 c3 $8.; format frequent2 8.1; drop c2; if marital = 0 then marital2 = 'single'; else if marital = 1 then marital2 = 'married'; else marital2 = 'unknown'; c3 = trim(c2); frequent2 = frequent; frequent3 = frequent;",
"serviceImplementation": 0,
"userName": "anonymous",
"version": 5,
"viya": "4.0"
}
```

FIG. 21C

| Column | Type | Key |
|--------|------|-----|
| job    | JSON |     |
| id     | char(32) | YES |
| ts     | timestamp |   |

FIG. 21D

```
CREATE FUNCTION sasDataStepFunction123(_SASID_  char(32),
                                       c2       varchar(32),
                                       frequent DOUBLE,
                                       marital  DOUBLE)
    RETURNS TABLE (marital2 CHAR(8),
                   c3       CHAR(8),
                   frequent2 DOUBLE,
                   frequent3 DOUBLE) USING
SAS_EMBEDDED_PROCESS_LIBRARY
```
2150

FIG. 21E

```
CREATE TABLE sampleTableOut AS
    SELECT sasepin.frequent,
           sasepin.marital,
           sasepout.marital2,
           sasepout.c3,
           sasepout.frequent2,
           sasepout.frequent3
       FROM sampletable1 AS sasepin
       JOIN sasDataStepFunction123(c2, frequent, marital) AS
sasepout
```
2160

FIG. 21F

ARCHITECTURE FOR EXECUTION OF COMPUTER PROGRAMS INSIDE DATA SYSTEMS

CROSS-REFERENCE TO RELATED APPLICATIONS

This application claims the benefit of, and priority based on, 35 U.S.C. § 119 to U.S. Provisional Application No. 63/557,582, filed Feb. 25, 2024, the disclosure of which is incorporated herein by reference in its entirety.

BACKGROUND

Data can be stored and organized by specialized computing systems for data platform software (e.g., file or database management systems). In traditional computing systems, data from data platform software is brought to a separate machine performing the computation regardless of where the computation occurs. For instance, in distributed computing systems, the place where data is stored is usually not the place where the computation on the data occurs. That means data needs to be moved from one computing system to another. This is especially true in analytics, where computations are often made on large blocks of data.

SUMMARY

In an example embodiment, a computer-program product tangibly embodied in a non-transitory machine-readable storage medium is provided. The computer-program product includes instructions to cause a first computing system, comprising a service entity, to receive, at the service entity, from a data exchange entity, an execution command indicating for the service entity to store an instance of a first data program in a first memory portion of the first computing system. An access layer of the first computing system comprises the data exchange entity. The access layer provides access for in-database processes to retrieve input data stored in a second memory portion of the first computing system and store output data to a third memory portion of the first computing system. The in-database processes comprise processes of the service entity. The processes of the service entity are configured to store the instance of the first data program by storing, in the first memory portion of the first computing system, computer instructions based on an external data program of an external computing system external to the first computing system. Alternatively, or additionally the computer-program product includes instructions to cause a first computing system to receive, at the service entity, from the data exchange entity, an indication of availability of the input data stored in the second memory portion, wherein the input data is available for use by the instance of the first data program. Alternatively, or additionally the computer-program product includes instructions to cause a first computing system to send, from the service entity, to the data exchange entity, an indication of availability of the output data stored in the third memory portion of the first computing system. The output data is generated based on execution of the instance of the first data program.

In another example embodiment, a computing system is provided. The computing system comprises processor and memory. The memory contains instructions executable by the processor wherein the first computing system is configured to receive, at a service entity, from a data exchange entity, an execution command indicating for the service entity to store an instance of a first data program in a first memory portion of the first computing system. An access layer of the first computing system comprises the data exchange entity. The access layer provides access for in-database processes to retrieve input data stored in a second memory portion of the first computing system and store output data to a third memory portion of the first computing system. The in-database processes comprise processes of the service entity. The processes of the service entity are configured to store the instance of the first data program by storing, in the first memory portion of the first computing system, computer instructions based on an external data program of an external computing system external to the first computing system. The external computing system does not comprise the processor and memory of the first computing system. Alternatively, or additionally, the memory contains instructions executable by the processor wherein the first computing system is configured to receive, at the service entity, from the data exchange entity, an indication of availability of the input data stored in the second memory portion. The input data is available for use by the instance of the first data program. Alternatively, or additionally, memory contains instructions executable by the processor wherein the first computing system is configured to send, from the service entity, to the data exchange entity, an indication of availability of the output data stored in the third memory portion of the first computing system. The output data is generated based on execution of the instance of the first data program.

In another example embodiment, a method of sending an indication of availability of output data according to computer-generated computer instructions is provided.

In another example embodiment, a computer-program product tangibly embodied in a non-transitory machine-readable storage medium is provided. The computer-program product includes instructions to cause a first computing system, comprising a data exchange entity, to send, from the data exchange entity, to a service entity, an execution command indicating for the service entity to store an instance of a first data program in a first memory portion of a first computing system of the first computing system. An access layer of the first computing system comprises the data exchange entity. The access layer provides access for in-database processes to retrieve input data stored in a second memory portion of the first computing system and store output data to a third memory portion of the first computing system. The in-database processes comprise processes of the service entity. The processes of the service entity are configured to store the instance of the first data program by storing, in the first memory portion of the first computing system, computer instructions based on an external data program of an external computing system external to the first computing system. Alternatively, or additionally, the computer-program product includes instructions to cause a first computing system to send, from the data exchange entity, to a service entity, an indication of availability of the input data stored in the second memory portion. The input data is available for use by the instance of the first data program stored on the first computing system. Alternatively, or additionally, the computer-program product includes instructions to cause a first computing system to receive, at the data exchange entity, from the service entity, an indication of availability of the output data stored in the third memory portion of the first computing system. The output data is generated based on execution of the instance of the first data program.

In another example embodiment, a method of receiving an indication of availability of output data according to computer-generated computer instructions is provided.

In another example embodiment, a computing system is provided. The computing system includes, but is not limited to, a processor and memory. The memory contains instructions that when executed by the processor control the computing system to receive an indication of availability of output data according to computer-generated computer instructions.

One or more example embodiments can be utilized together or separately. Other features and aspects of example embodiments are presented below in the Detailed Description when read in connection with the drawings presented with this application.

BRIEF DESCRIPTION OF THE DRAWINGS

FIGS. 20A-20C illustrate client node computer instructions, input data, and output data according to at least one embodiment of the present technology.

FIGS. 21A-21F illustrate data system computer instructions and data according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
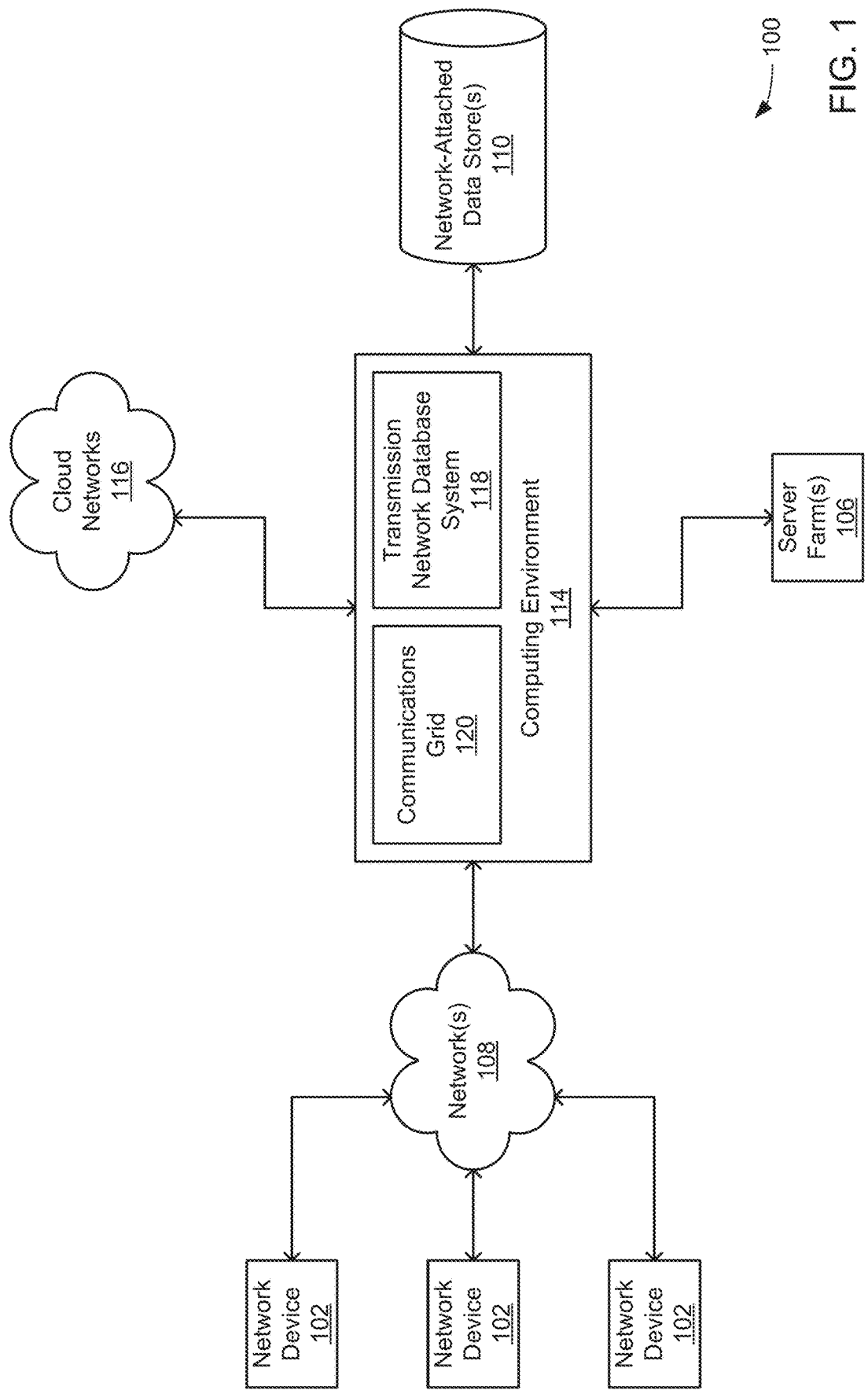
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
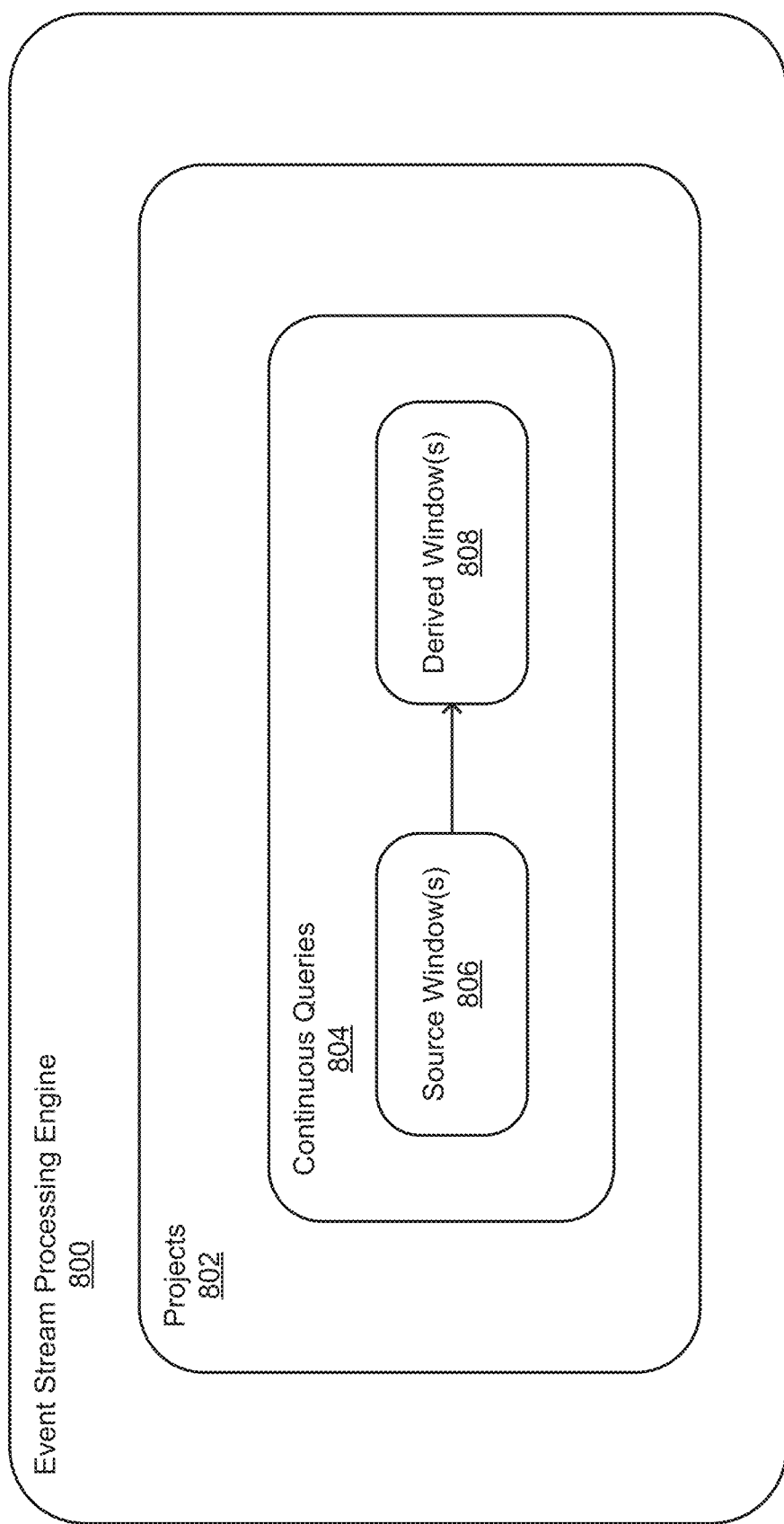
FIG. 8 illustrates a block diagram including components of an Event Stream Processing Engine (ESPE), according to embodiments of the present technology.
Figure 9:
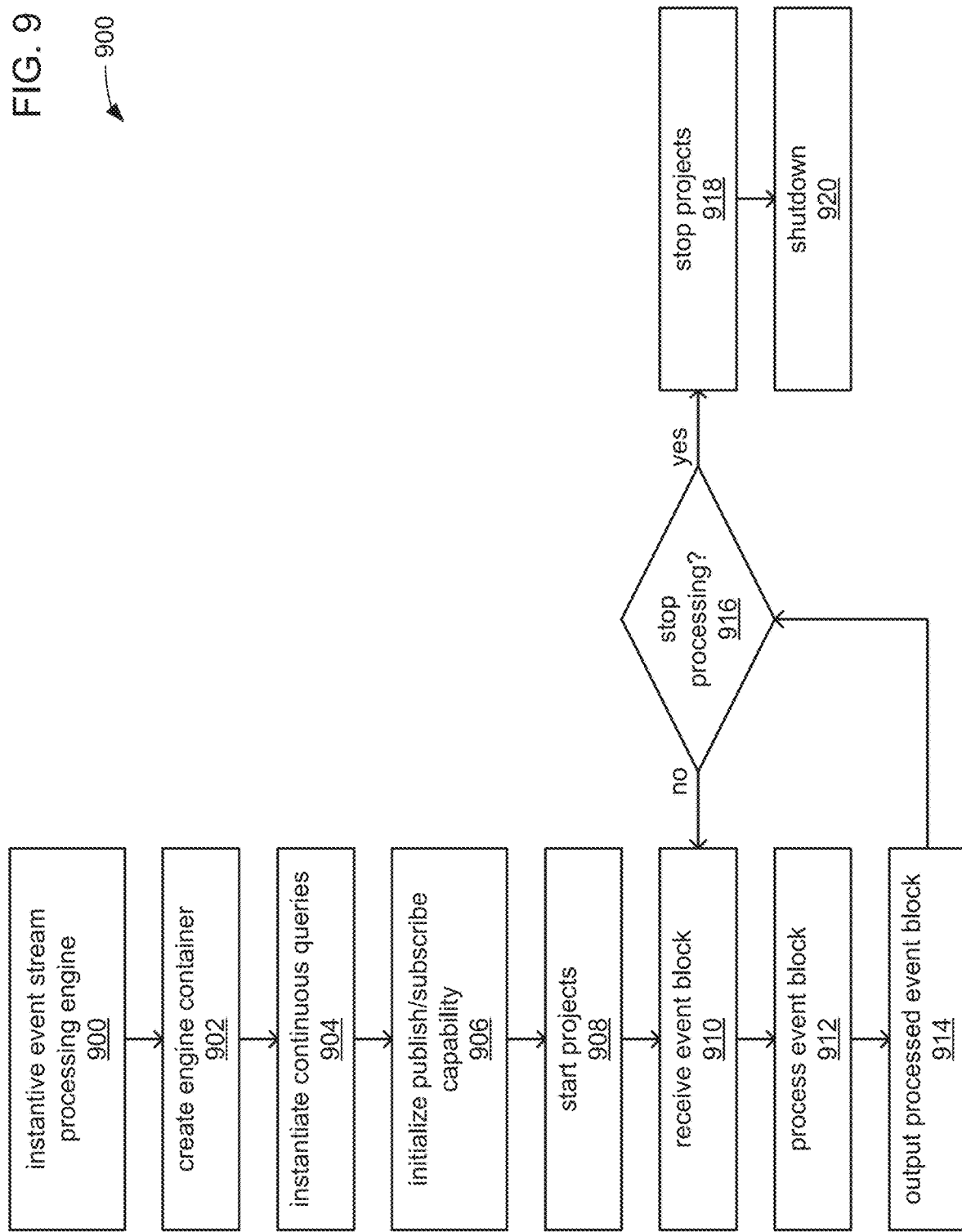
FIG. 9 illustrates a flow chart showing an example process including operations performed by an event stream processing engine, according to some embodiments of the present technology.
Figure 10:
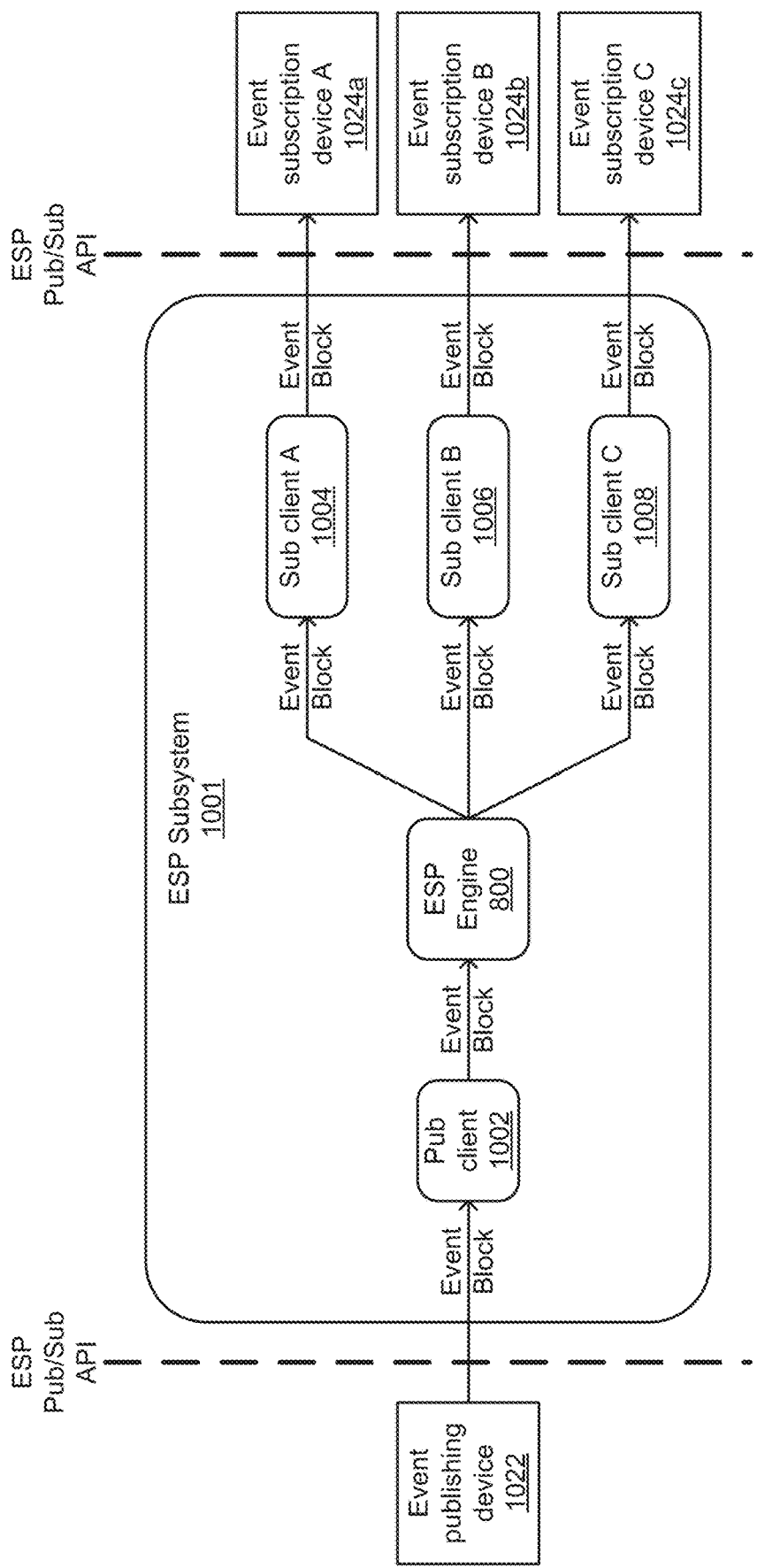
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP or MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
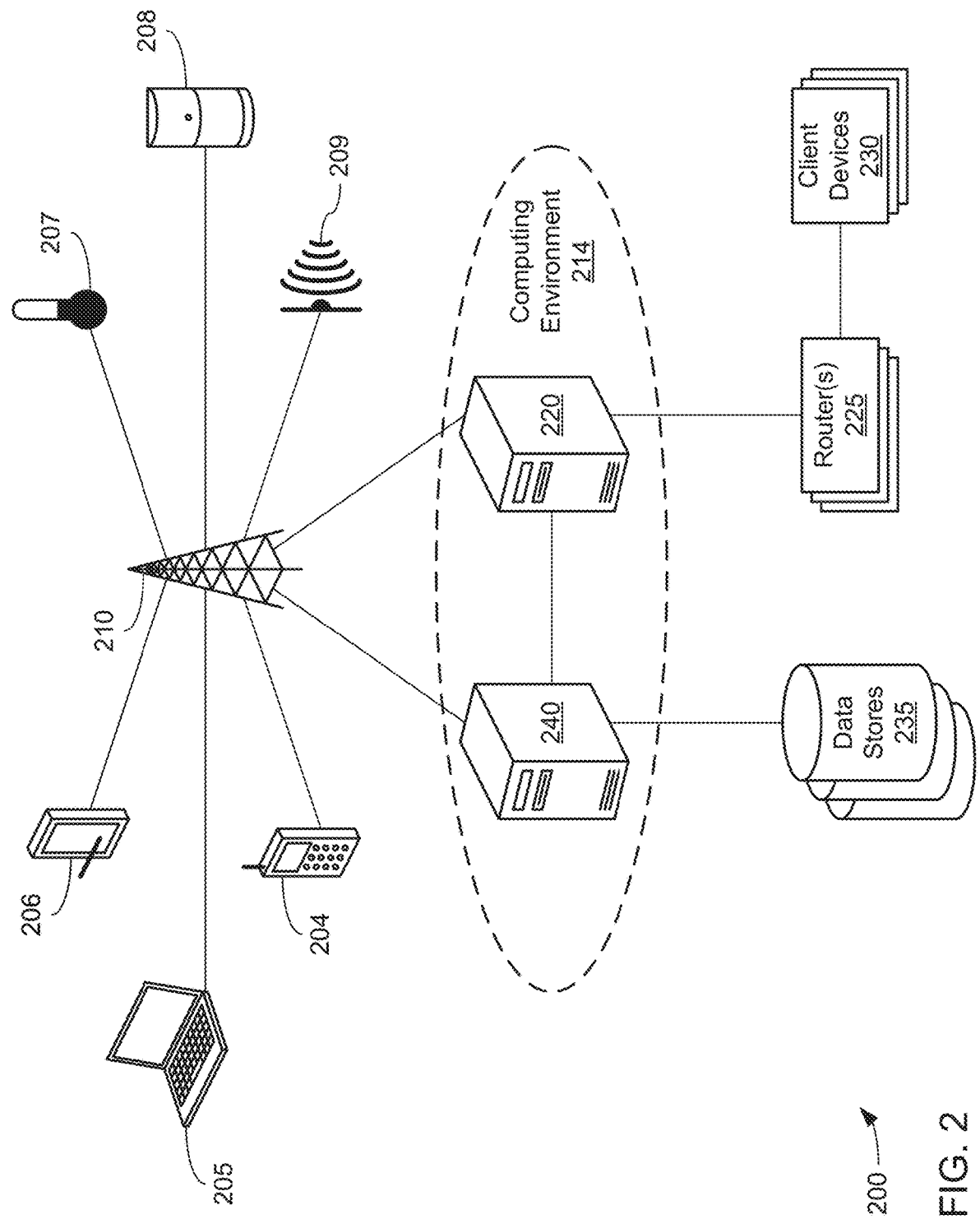
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
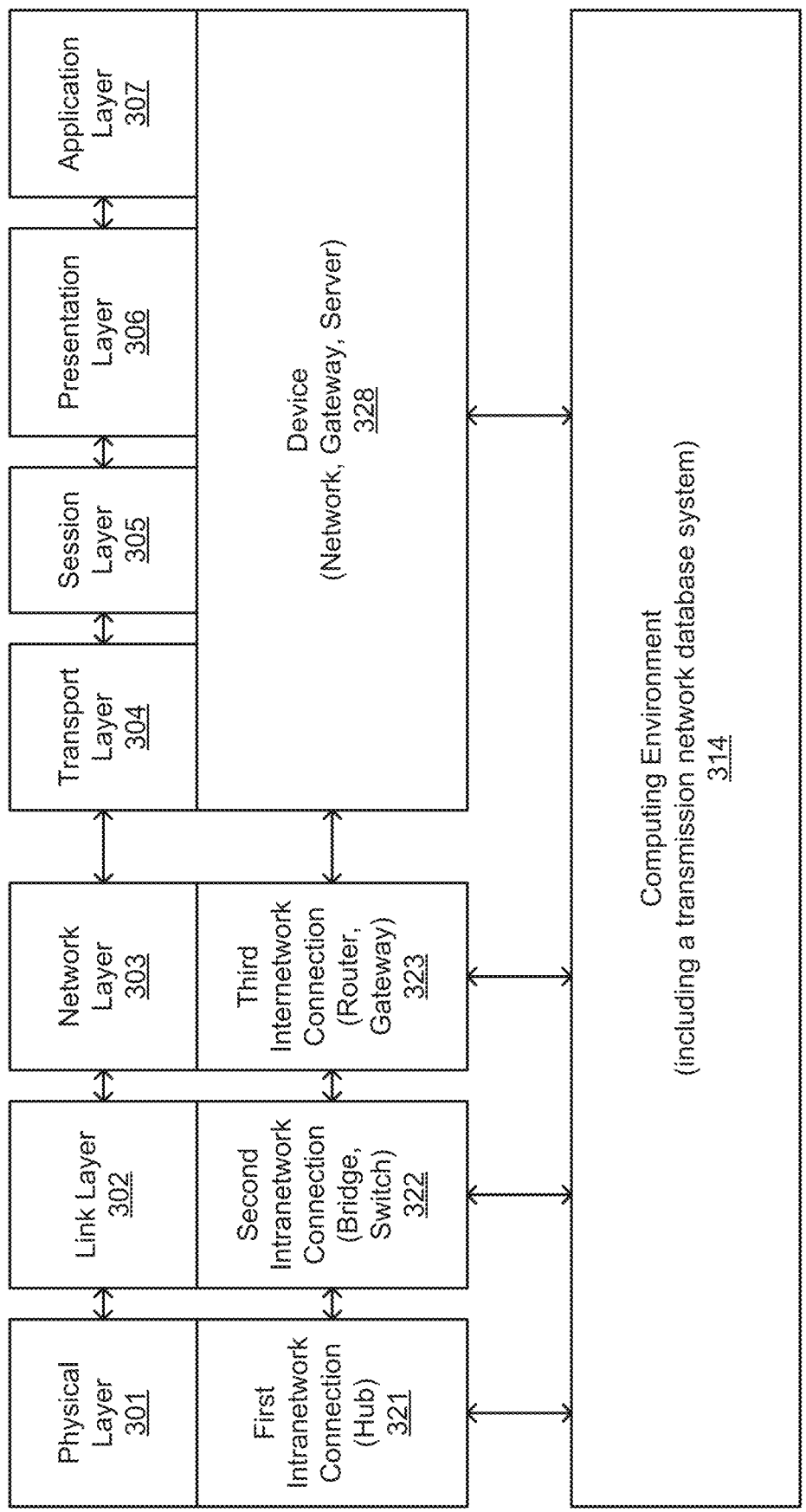
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data and is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
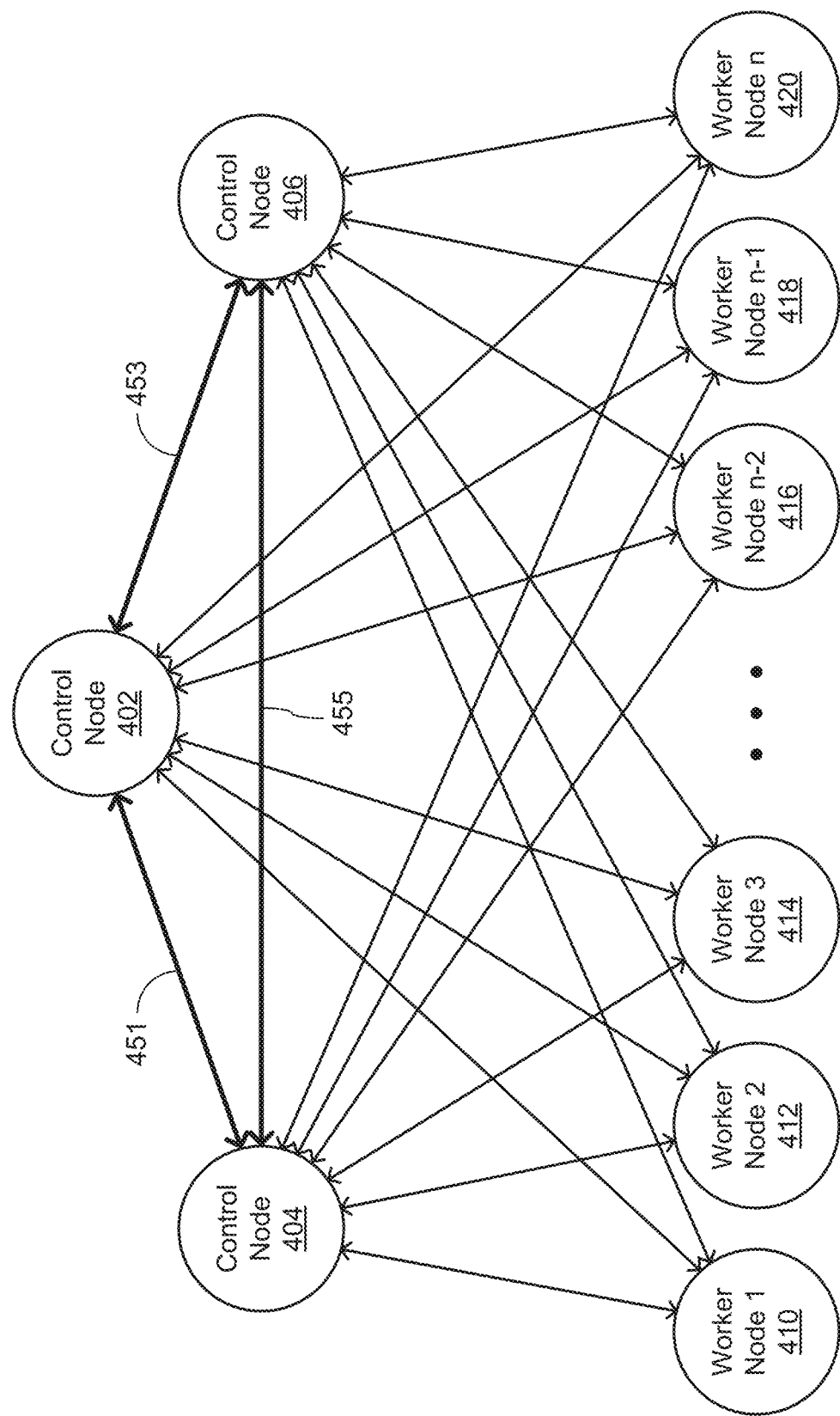
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
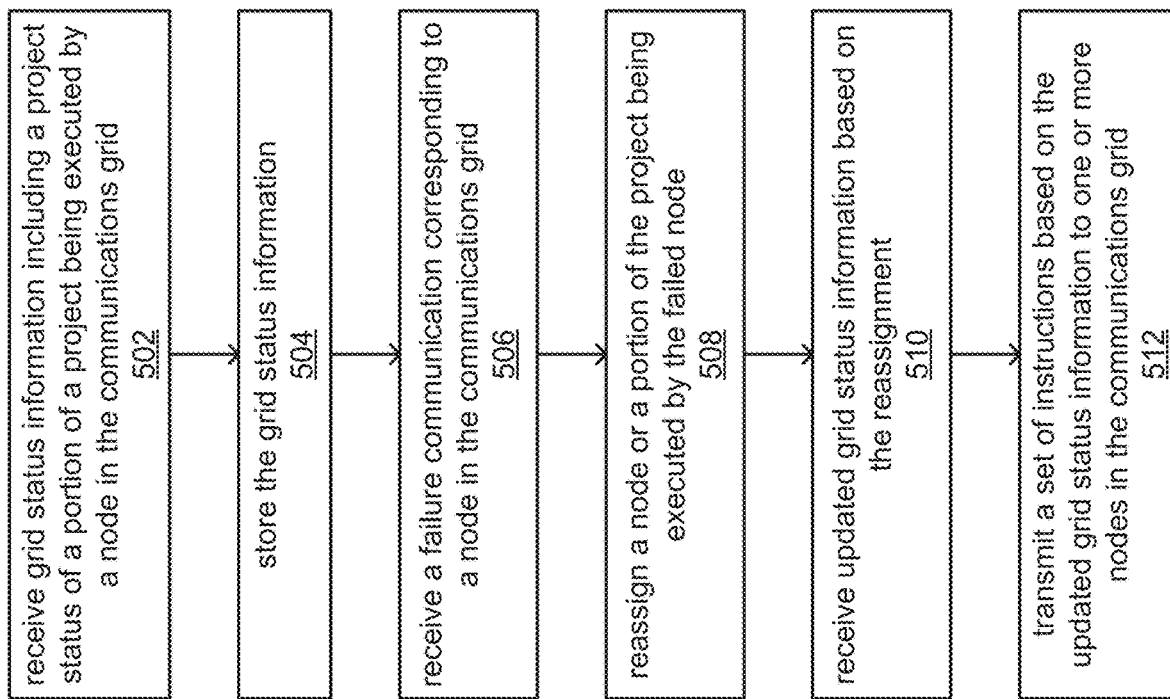
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
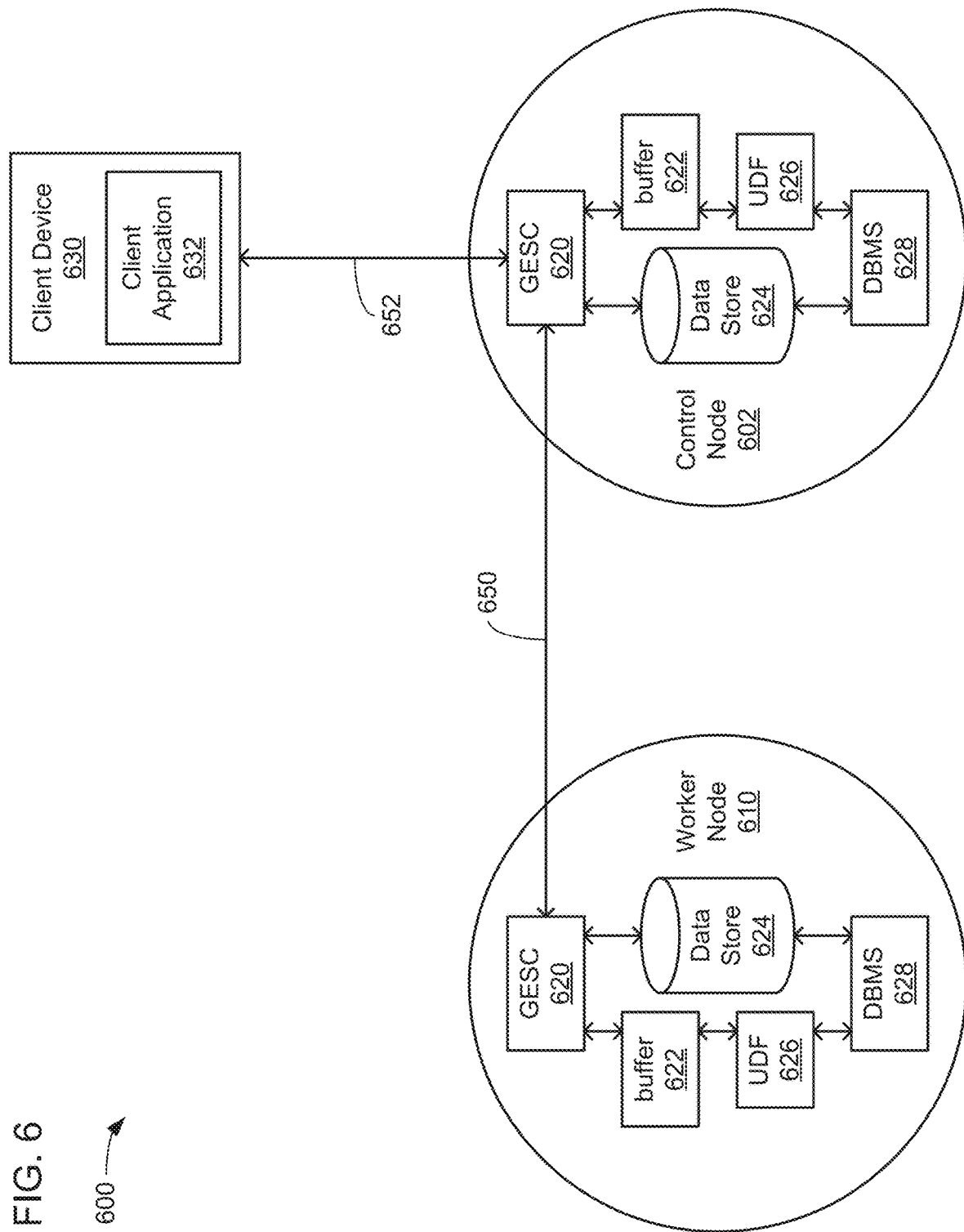
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
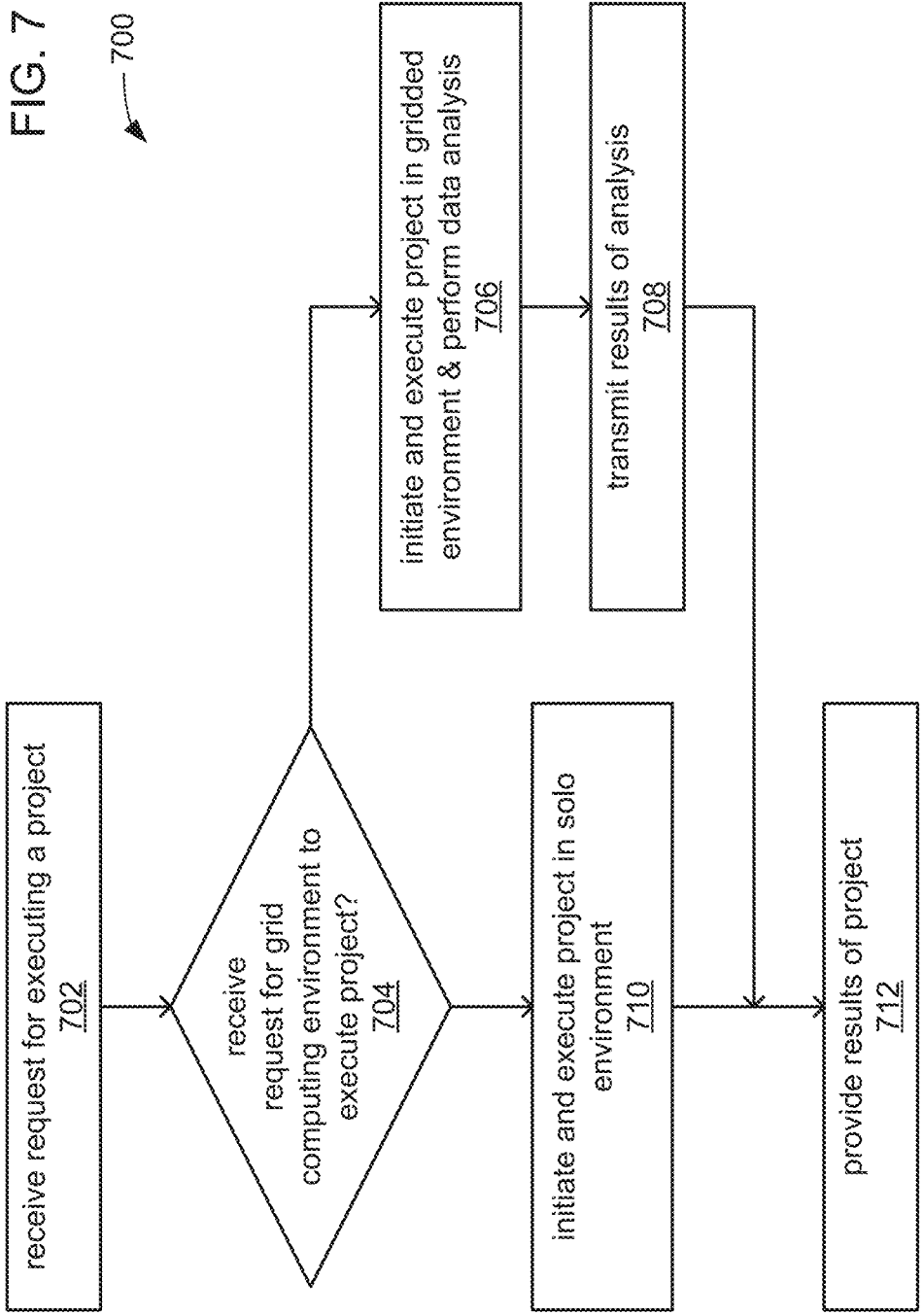
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a*-*c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
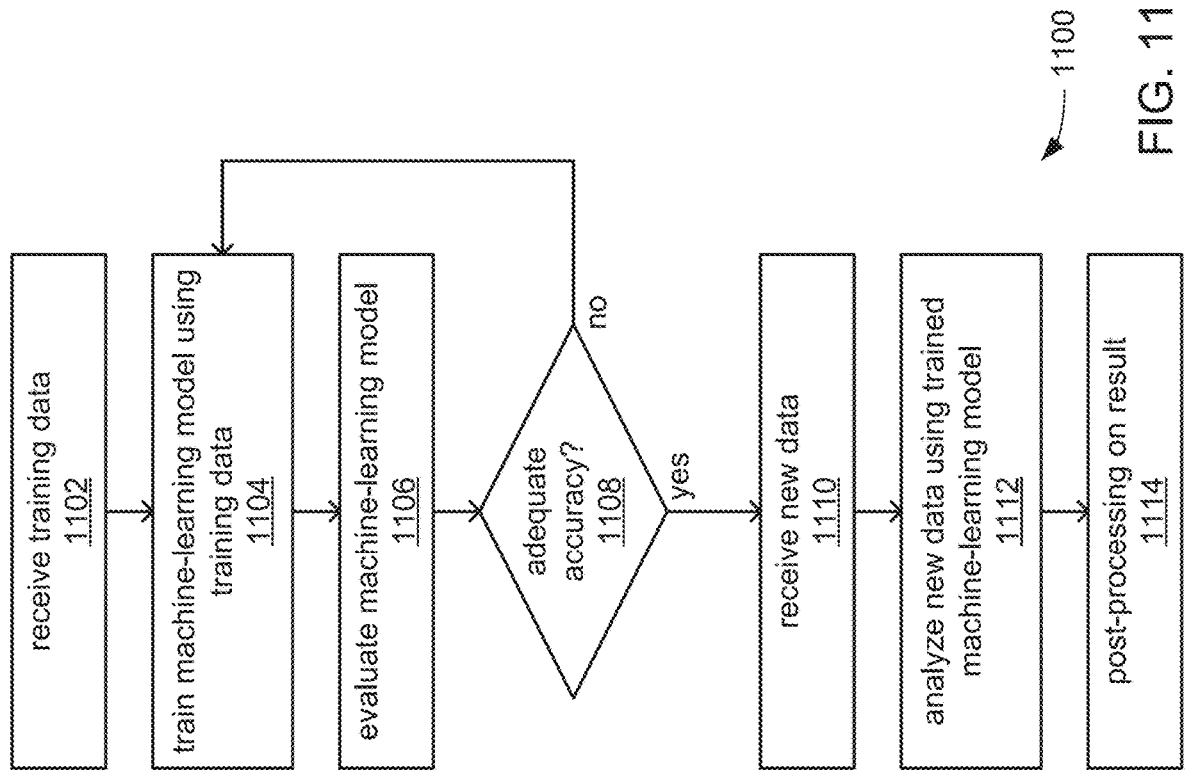
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
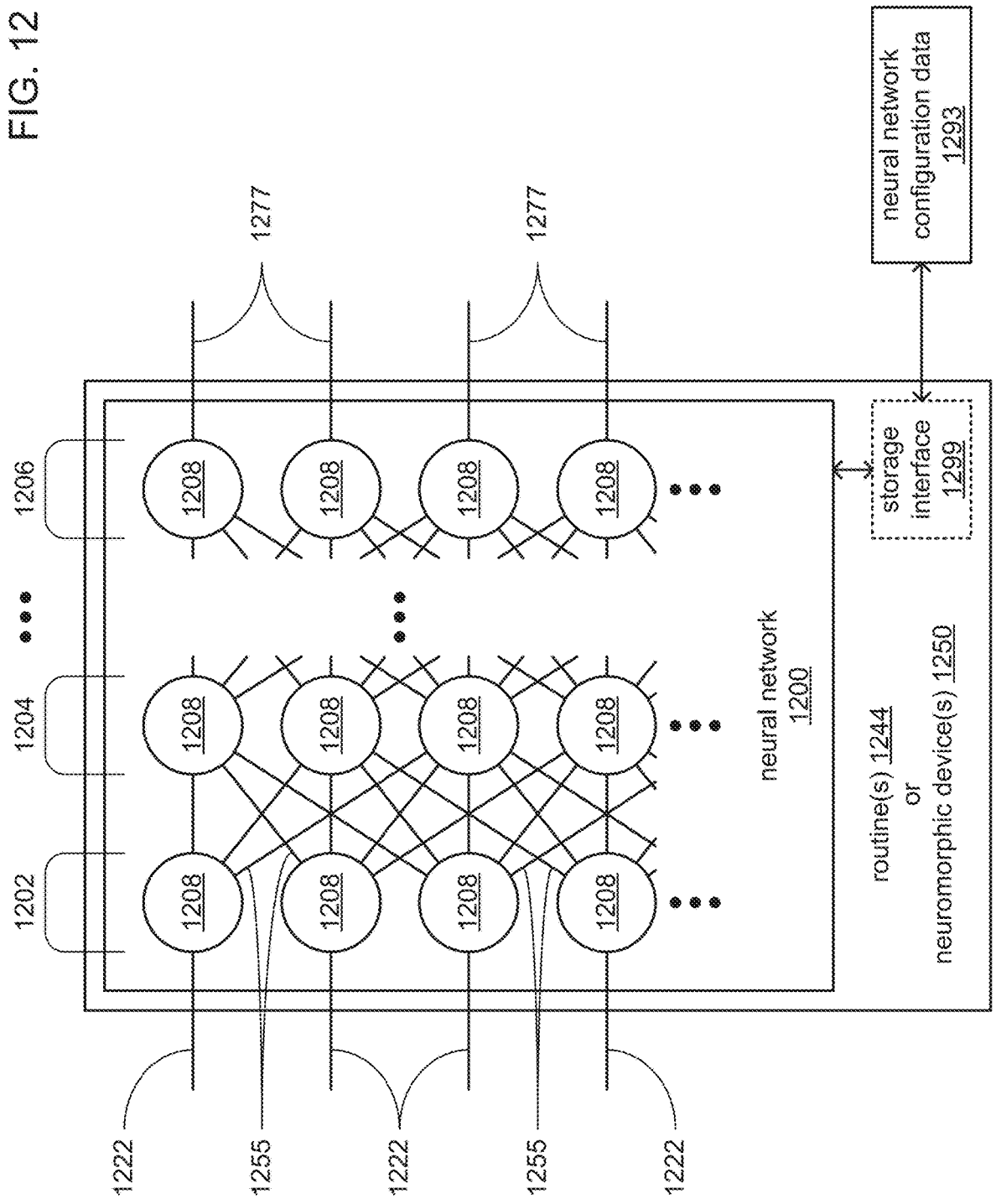
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
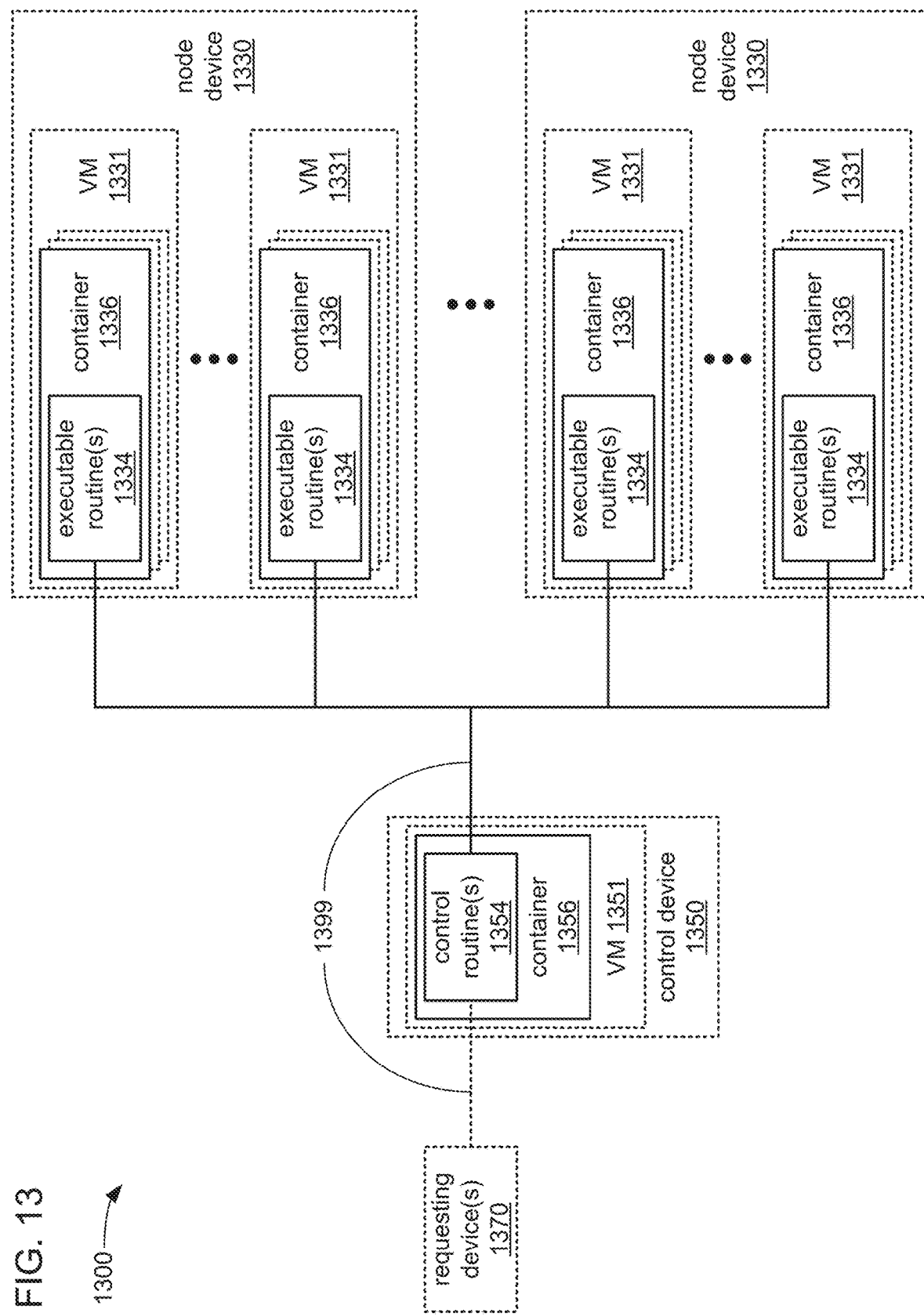
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that affects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies there among, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation, and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending there among. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

One or more embodiments herein provide for execution of a data program inside data systems so that data need not be exchanged between systems. Data movement can be processing-intensive, inefficient, and risky if it leads to data corruption. Architecture described in one or more embodiments provides for deployment, to a data system, of a data program from an external system. In this way the data program need not be specially written for the data system and need not remain in storage of the data system. This approach can allow for ad hoc extension of the capabilities of the data system without having to make program-specific changes to the data system or data-system-specific changes to a data program.

Figure 14:
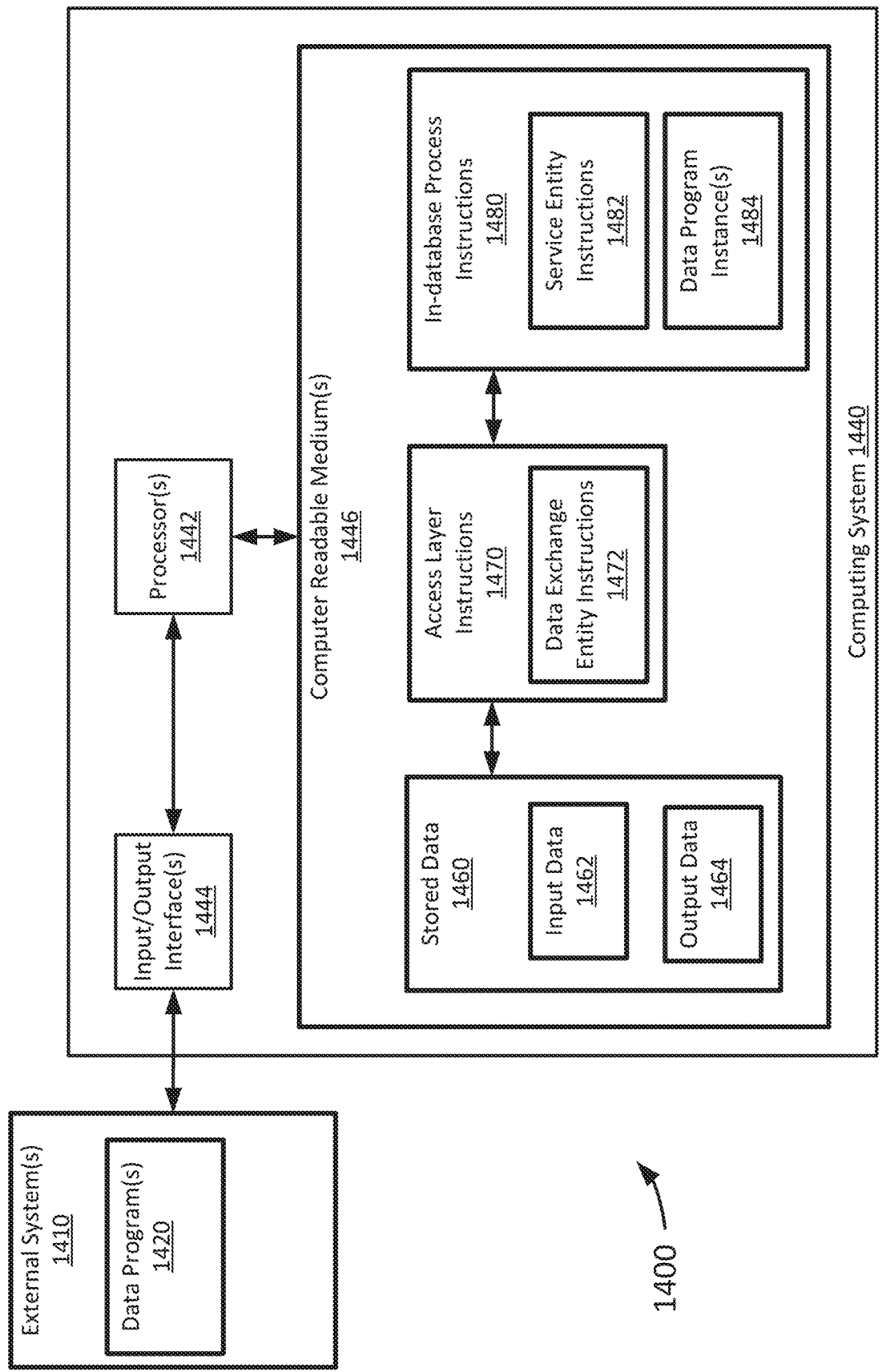
FIG. 14 illustrates a block diagram of a system for executing a data program instance on data of the computing system according to at least one embodiment of the present technology.

FIG. 14 illustrates a block diagram of a system 1400 for executing a data program instance (e.g., data program instance(s) 1484) on data (e.g., input data 1462) of the computing system 1440. The computing system 1440 is configured to exchange information between devices in the system (e.g., via wired and/or wireless transmission). For example, a network (not shown) can connect the computing system 1440 with an external system 1410 external to the computing system 1440.

The external system 1410 can itself be a type of computing system (e.g., one capable of executing data program(s) 1420 for performing computer operations on data of the external system 1410 or data of other systems such as computing system 1440). The external system 1410 can be a storage system such as an electronic library for storing data program(s) 1420 for execution elsewhere. As an external system it has its own components (not shown) for operating (e.g., for executing data program 1420) that are separate and distinct from computing system 1440 components (e.g., separate and distinct from processor(s) 1442 and computer readable medium(s) 1446). The external system 1410 can be remote in location or housing from computing system 1440. Alternatively, or additionally, the computing system 1440 can utilize different computer languages or protocols for executing in-database processes than used by the external system 1410 for executing data program(s) 1420.

In one or more embodiments, the computing system 1440 has computer readable medium(s) 1446 for storing data programs and a processor(s) 1442 for processing data programs. Computer readable medium(s) 1446 is an electronic holding place or storage for information so the information can be accessed by processor(s) 1442. For instance, the computer readable medium(s) 1446 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc. In one or more embodiments, the computer readable medium(s) 1446 provide database storage useful for organizing a collection of structed information. For example, a database can store stored data 1460 in files or tables that can include input data 1462 for data program instance(s) 1484 and output data 1464 output from data program instance(s) 1484. In one or more embodiments, the computer readable medium(s) 1446 comprises multiple databases that can be searched individually or collectively for data.

In one or more embodiments, the computer readable medium(s) 1446 stores instructions for execution by processor(s) 1442. The instructions can be carried out by a special purpose computer, logic circuits, or hardware circuits. In one or more embodiments, processor(s) 1442 is implemented in hardware and/or firmware. Processor(s) 1442 executes an instruction, meaning it performs or controls the operations called for by that instruction. The term "execution" is the process of running a process or the carrying out of the operation called for by an instruction. The instructions can be written using one or more programming language, scripting language, assembly language, etc. Processor(s) 1442 operably couples with components of computing system 1440 (e.g., input and or output interface(s) 1444, and computer readable medium 1446) to receive, to send, and to process information.

For instance, instructions stored in computer readable medium(s) 1446 and processed by processor(s) 1442 could include in-database process instructions 1480. These computer instructions could include persistent or temporarily stored computer instructions for operations on stored data 1460. For instance, some persistent in-database processes can be related to filtering, aggregation, or joining processes for stored data. In embodiments, in-database processes could be used to store data program instance(s) 1484 temporarily and based on data program(s) 1420 for operations on input data 1462. Computer instructions could include access layer instructions 1470 for in-database processes to retrieve input data 1462 and store output data 1460. Retrieval could involve one or more of indicating a location of input data 1462, reformatting input data 1462, moving input data 1462 within computer-readable medium(s) 1446, etc. Retrieval could involve searching, individually or collectively, one or more databases for availability of the input data 1462. For instance, data exchange entity instructions 1472 could be processed by processor(s) 1442 to provide indications of availability of input data (e.g., to in-database processes). Alternatively, or additionally, the data exchange entity instructions 1472 could be processed by processor(s) 1442 to provide or support execution commands for in-database processes. The data exchange entity instructions could represent the function of a data exchanger or data exchange component of computing system 1440.

In one or more embodiments, access layer instructions 1470 provide data exchange entity instructions 1472 for supporting a data exchange entity. In-database process instructions 1480 provide service entity instructions 1482 to support a service entity. For instance, service entity instructions 1482 can represent a service component or module of computing system 1440 such that a data exchange entity and a service exchange entity can communicate for accessing stored data 1460 by in-database processes. For example, a service entity could receive from a data exchange entity an execution command indicating for the service entity to store an instance of data program (e.g., a data program based on data programs 1420). The service entity can store data program instance(s) 1484 in response. Alternatively, or additionally, a service entity could receive an indication of availability of the input data 1462 that is available for use by the data program instance(s). Alternatively, or additionally, a data exchange entity can send an indication of availability of the output data 1464 is generated based on execution of data program instance(s) by processor(s) 1442. Example embodiments will describe a data exchange entity and a service entity in more detail herein.

Other applications or software tools (not shown) can be integrated into computing system 1440 (e.g., stored in computer readable memory(s) 1446). However, data exchange entity and service entity allow for the flexible ad hoc creating, executing, and destroying of data program instance(s) 1484. Merely for illustration, integrated programs and data program instance(s) 1484 can be implemented using, implemented based on, or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. or JMP Statistical Discovery LLC of Cary, N.C., USA.

The computing system 1440 can comprise input and/or output interface(s) 1444 for communicating with integrated systems or external system(s) 1410 (e.g., for receiving data programs(s) 1420 or providing indications of availability of output from data program instance(s)).

In one or more embodiments, fewer, different, and additional components can be incorporated into system 1400. For instance, external system(s) 1410 can include graphical user interfaces for viewing input or output for data program(s) 1420 or user control of external system(s) 1410. As another example, the input and/or output interface(s) 1444 can have more than one input interface that uses the same or different interface technology. Alternatively, or additionally, the input and/or output interface(s) 1444 can have more than one output interface that uses the same or different interface technology. The computing system 1440 or external system (s) 1410 can each be a computing device or comprise other components of a computing device.

Figure 15A:
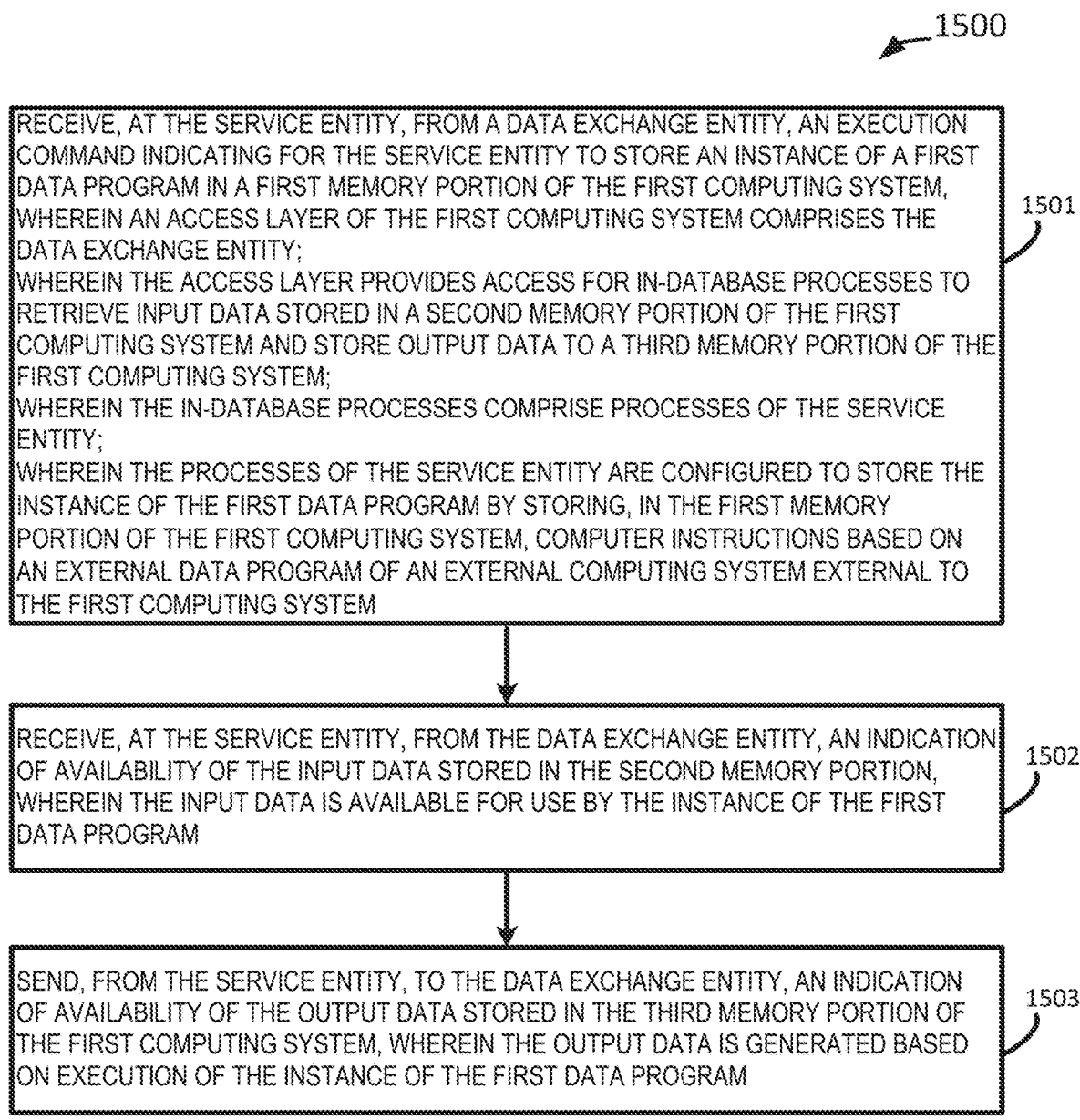
FIGS. 15A-15B illustrate flow diagrams for executing a data program instance on data of the computing system according to at least one embodiment of the present technology.
Figure 15B:
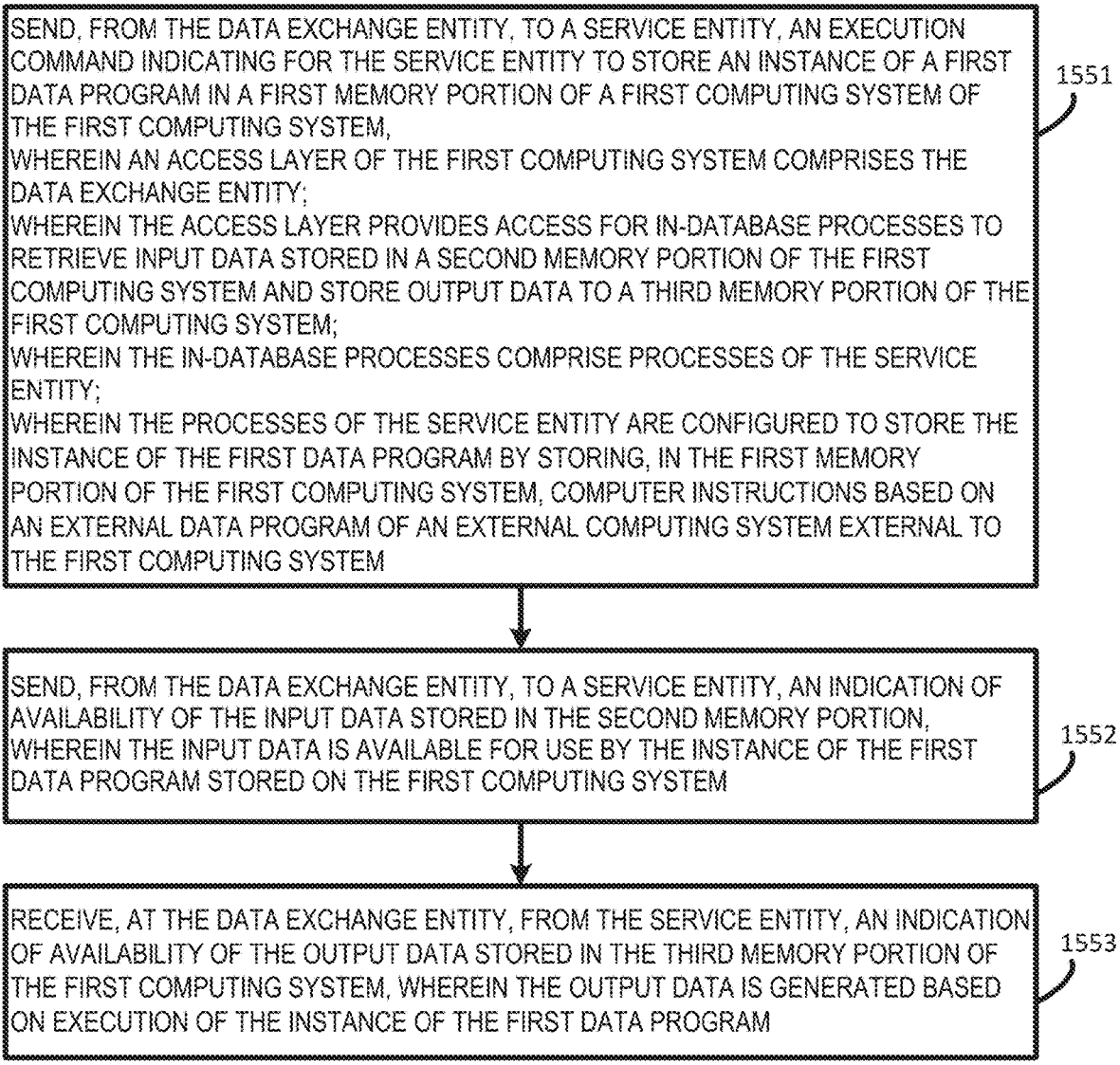

In one or more embodiments, the system 1400 implements a method as described herein (e.g., a method 1500 shown in FIG. 15A or a method 1550 shown in FIG. 15B).

FIGS. 15A-15B illustrate flow diagrams for executing a data program instance on data of a computing system (e.g., computing system 1440). FIG. 15A illustrates a method 1500 for sending an indication of availability of output data (e.g., output data 1464) generated based on execution of one or more instances of a data program (e.g., data program instance(s) 1484. The method 1500 can be implemented by a computing system (e.g., computing system 1440).

The method 1500 comprises an operation 1501 that includes receiving, at a service entity, from a data exchange entity, an execution command indicating for the service entity to store an instance of a first data program in a first memory portion of the first computing system. An access layer of the first computing system (e.g., computing system 1440) comprises the data exchange entity. For instance, the access layer may comprise computer instructions for supporting access as shown in FIG. 14. An entity can represent a set of computer instructions for performing a function in a computing system. The access layer instructions can comprise instructions for supporting the data exchange entity. The access layer provides access for in-database processes to retrieve input data stored in a second memory portion of the first computing system and store output data to a third memory portion of the computing system. The in-database processes comprise processes of the service entity. For instance, the service entity may represent a set of computer instructions for performing service processes within the database as shown in FIG. 14. For example, the processes of the service entity are configured to store the instance of the first data program by storing, in the first memory portion of the first computing system, computer instructions based on an external data program of an external computing system external to the first computing system. In this way capabilities of external data programs can be used within a first computing system such as a data management system so that data does not need to be moved to the external computing system.

Embodiments can also execute data program instances that may be in a different language than other in-database process instructions. For example, in some embodiments the instance of the first data program can comprise a copy of computer instructions of the external data program. Computer instructions for the first data program may be in a language different than one normally employed for in-database process instructions. For instance, the in-database processes may normally use a Java language and not use a DS2 language for executing operations on stored data. However, the data program may be written in a DS2 language and data program instance(s) can also be in the DS2 language even when they are stored or ported with in-database process instructions. In embodiments, the first, second, and third memory portions can all be in the same data storage entity of a data platform or one or more can be in different data storage entities of a data platform.

The method 1500 comprises an operation 1502 that includes receiving, at the service entity, from the data exchange entity, an indication of availability of the input data stored in the second memory portion (e.g., a location of the data). The input data is available for use by the instance of the first data program. In one or more embodiments, the input data can need to be manipulated or information provided to an instance of the data program in order for it to be available to an instance that is based on an external data program. For instance, the data can need to be reformatted to be readable by the instance of the data program.

The method 1500 comprises an operation 1503 that includes sending, from the service entity, to the data exchange entity, an indication of availability of the output data stored in the third memory portion of the first computing system. The output data is generated based on execution of the instance of the first data program. For example, an indication could be received once execution of the instance of the first data program is complete.

FIG. 15B illustrates a method for sending an indication of availability of the output data generated based on execution of one or more instances of a data program. The method 1500 can be implemented by a computing system (e.g., computing system 1440). FIG. 15A and FIG. 15B each illustrate methods that can each be executed by a computing system individually. In one or more embodiments, the method 1500 of FIG. 15A and the method 1550 of FIG. 15B can be executed by a computing system together (e.g., that which is sent according to the method 1500 can be received according to the method 1550) as shown by embodiments herein.

The method 1550 comprises an operation 1551 that includes sending, from the data exchange entity, to a service entity, an execution command indicating for the service entity to store an instance of a first data program in a first memory portion of a first computing system of the first computing system. An access layer of the first computing system comprises the data exchange entity. The access layer provides access for in-database processes to retrieve input data stored in a second memory portion of the first computing system and store output data to a third memory portion of the first computing system. The in-database processes comprise processes of the service entity. The processes of the service entity are configured to store the instance of the first data program by storing, in the first memory portion of the first computing system, computer instructions based on an external data program of an external computing system external to the first computing system. For example, the instance of the first data program can comprise a copy of computer instructions of the external data program. The first, second, and third memory portions can all be in the same data storage entity or one or more can be in different data storage entities of a data platform.

The method 1550 comprises an operation 1552 that includes sending, from the data exchange entity, to a service entity, an indication of availability of the input data stored in the second memory portion. The input data is available for use by the instance of the first data program stored on the first computing system.

The method 1550 comprises an operation 1551 that includes receiving, at the data exchange entity, from the service entity, an indication of availability of the output data stored in the third memory portion of the first computing system. The output data is generated based on execution of the instance of the first data program.

Figure 16:
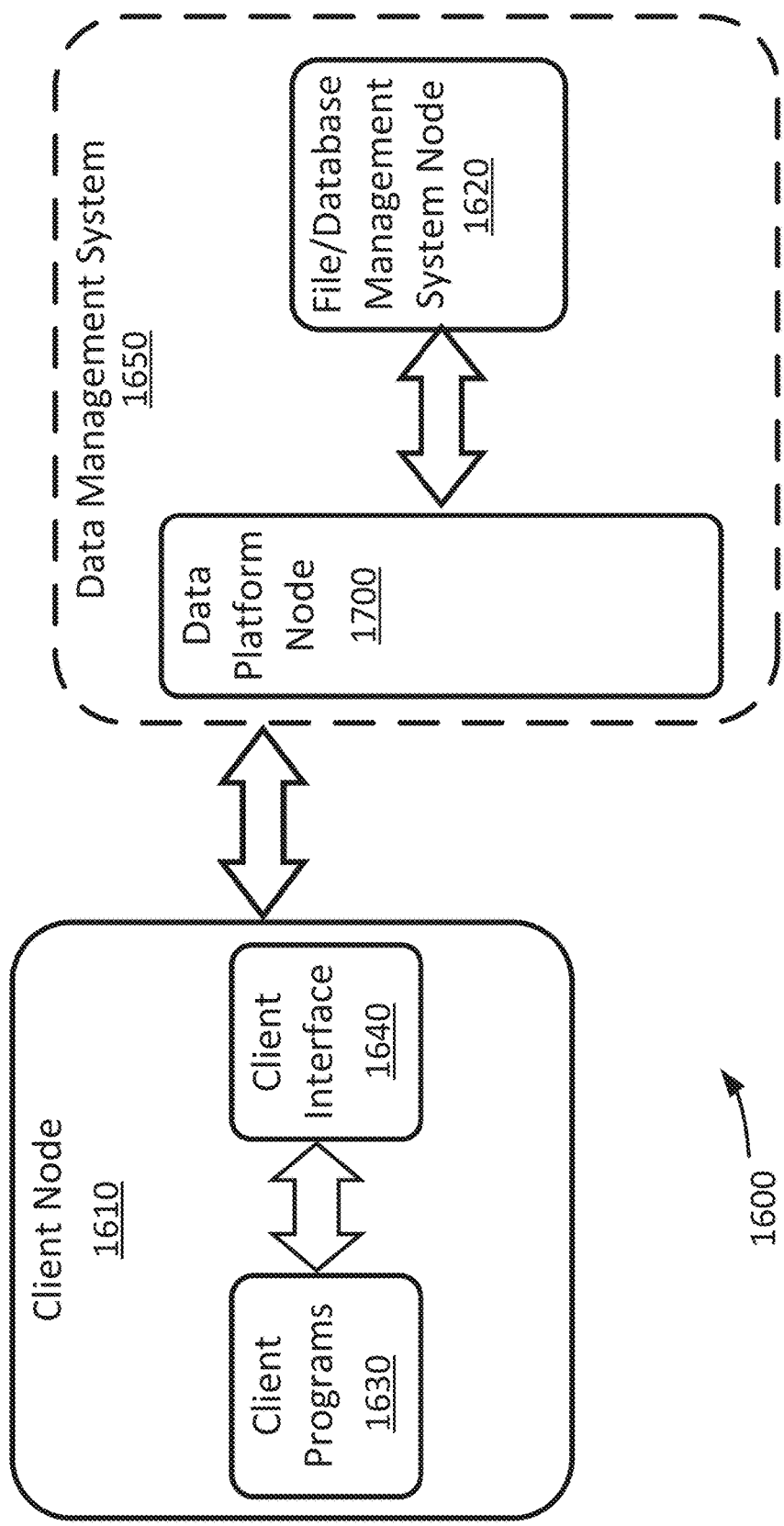
FIG. 16 illustrates a system comprising client nodes, file or database management system nodes, and a data platform node according to at least one embodiment of the present technology.
Figure 17:
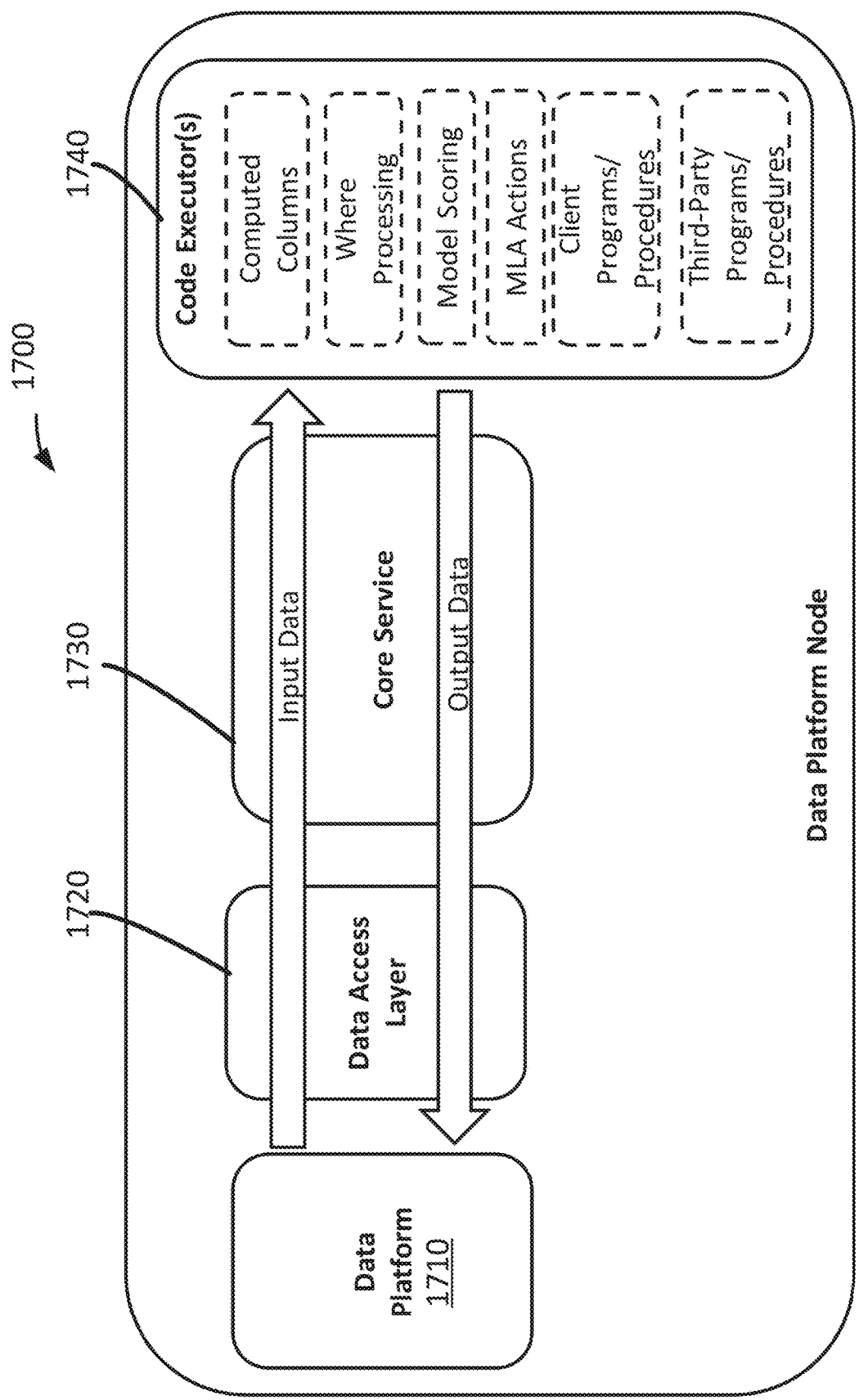
FIG. 17 illustrates a data platform node executing example code executors according to at least one embodiment of the present technology.

FIG. 16 provides an example of a Data Management System 1650 capable of implementing the methods of FIGS. 15A and 15B. FIG. 17 provides example components of Data Platform Node 1700 of Data Management System 1650 (e.g., a data access layer, a service entity, and code executors).

FIG. 16 illustrates a system 1600 comprising Client Node(s) 1610. The Client Nodes 1610 can communicate with components of a Data Management System 1650. For example, the Data Management System 1650 can comprise a Data Platform Node 1700 for data storage and processes on stored data. For instance, The Data Platform Node 1700 can provide tables or files for structured storage of data. In some embodiments, the Data Management System 1650 has a File or Database Management System Node(s) 1620 for controlling the Data Platform Node 1700). The Data Management System 1650 can be remote from the Client Node(s) 1610. Alternatively, or additionally, programs of the data management system can utilize different computer language than the client programs or programs called by the Client Program(s) 1630. The Data Platform Node 1700 can store data that the Client Node 1610 wants for execution by the Client Program(s) 1630. Rather than bring the data to the Client Node 1610, embodiments herein allow the Data Management System 1650 to implement the Client Program(s) 1630.

For instance, the Client Interface 1640 can provide a common Application Programming Interface (API) that allows code running in Client Program(s) 1630 to dispatch the code to run inside any data platform system (e.g., Data Management System 1650). Dispatch could mean sending the code to a data management system. Alternatively, or additionally dispatch could mean initiating a third-party system to send the code (e.g., where the code is implemented or stored by a third-party system). Based on arguments Client Interface 1640 receives from Client Program(s) 1630, the Client Interface 1640 can generate metadata useful for a particular execution of code inside the Data Platform Node 1700. The Client Interface 1640 can also generate a sequence of commands or statements—such as PYTHON® code, Scala code or SQL statements—that is submitted to the Data Platform Node 1700. The generated sequence of commands or statements that are submitted to the Data Platform Node 1700 can drive execution of code of Client Program(s) (e.g., SAS® code) inside the Data Platform Node 1700. In this way programs can flexibly be implemented where data is stored.

Data Platform Node 1700 is shown in more detail with respect to FIG. 17. FIG. 17 illustrates a Data Platform Node 1700 executing example code executor(s). The Data Platform Node 1700 comprises a Data Access Layer 1720 that is a layer of software between a service entity such as Core Services 1730 and data platform such Data Platform 1710. Data Platform 1710 can be a software platform for collecting and managing data. The Data Access Layer 1720 can be a multi-threaded input/output (I/O) channel responsible for transferring data between a data platform and a service entity. Each I/O channel thread operates on a partition of the incoming and outgoing data. The multi-threaded environment provided by the Data Access Layer 1720 allows concurrent execution of batches of rows. The Data Access Layer 1720 could be considered a vendor data access layer in that it can be vendor specific for the Data Platform 1720. Example data platforms include those provided by SINGLE-STORE®, ORACLE®, SNOWFLAKE® or APACHE SPARK™. Depending on the data platform vendor, data can be exchanged through different means such as shared memory objects, Unix Domain Sockets, and semaphores.

The Core Service 1730 can be an extensible and multi-threaded interface responsible for communicating with the Data Access Layer 1720 and dispatching the execution of code inside the Code Executor(s) 1740 (e.g., code received based on Client Node 1610). Core Service 1730 can manage code life cycles in the Code Executor(s) 1740 (e.g., create, execute, and destroy functions described in more detail with respect to FIG. 18). Core Service 1730 can provide an interface for code executors to access data from Data Access Layer 1720 and allows multiple batches of rows representing input and output data to be processed at the same time. The Core Service 1730 can load and provides metadata to Code Executor(s) 1740. Metadata can identify the code to be executed, a list of input and output columns, and any additional parameter that is required by the Code Executor(s) 1740. FIGS. 21A-21F provide an example where metadata is a JSON string that contains information pertinent to the execution of the code inside a code executor.

Data programs processed by Code Executor(s) 1740 could be, for example, related to machine learning actions, model scoring, analytics computations, where clause processing, computed database table columns, or any arbitrary computer code such as client programs or procedures or third-party programs or procedures. A third-party could be from a source not related to the Data Platform Node 1700 or a client system utilizing the Data Platform Node 1700 (e.g., if the client system is a SAS® system the third-party could be a PYTHON® program). These Code Executor(s) 1740 can be added as extensions without having to develop a specific embedded process for a given program. For instance, the new In-Database architecture allows execution of SAS® computed columns, processing of where clause, SAS® formats, SAS® DATA STEP™, Multi-Language Architecture (MLA) Actions, and SAS® model scoring, among other functions. These functionalities can be implemented as extensions of the architecture's core components in Code Executor(s) 1740. The new architecture allows new code executors to be added as extensions without having to develop a whole new embedded process. In some embodiments, the Data Access Layer 1720 can be the only component in the architecture that has code uniquely written for a data platform vendor for executing the Code Executor(s) 1740.

Figure 18:
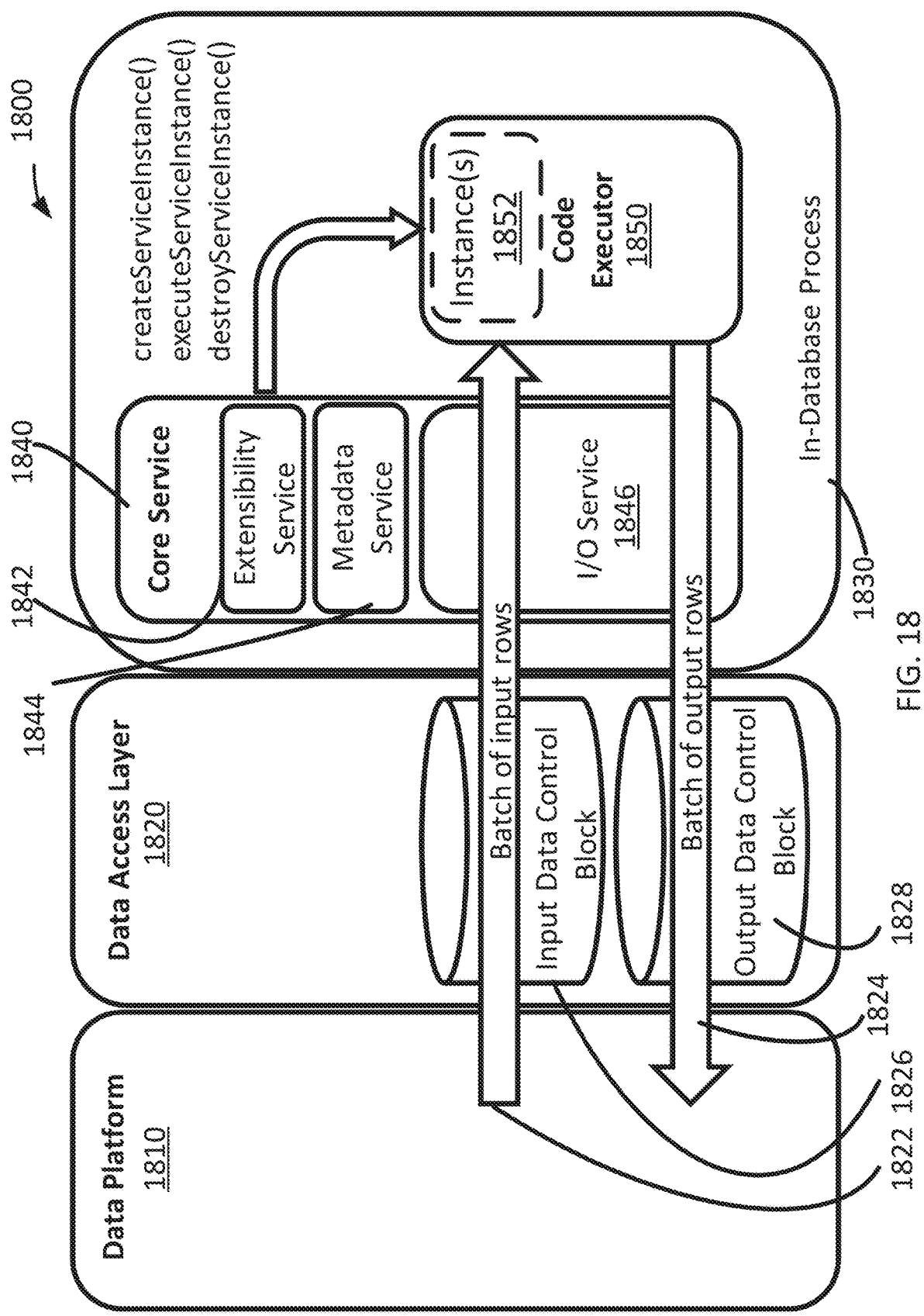
FIG. 18 illustrates a system comprising a core service entity for executing code executors according to at least one embodiment of the present technology.

FIG. 18 illustrates a system 1800 comprising a Core Service 1840 for executing code executors. Data in the Data Platform 1810 can be stored according to a data management system (e.g., in accordance with a file or database management system described herein). Using the Data Access Layer 1820, the In-Database Process 1830 can access input data and output data of the Data Platform 1810. Processes for accessing input data are described in more detail with respect to FIGS. 14-17 and 19. In this example, Data Access Layer 1820 can make Batch of Input Rows 1822 available to Code Executor(s) 1850 (e.g., using Input Data Control Block 1826). Data Access Layer 1820 can store Batch of Output Rows 1824 (e.g., using Input Data Control Block 1828) to the Data Platform 1810. In-Database Process 1830 can be in different computer languages than the computer instructions of a data program executed by Code Executor 1850. The Data Access Layer 1820 can provide a mechanism for transferring usable input data from stored data to In-Database Processes 1830 and transferring output data from In-Database Processes 1830 to stored data. For instance, the Data Access Layer 1820 can have read and write access to the data stored in the stored data of the Data Platform 1810. The In-Database Processes 1830 can have read and write access to data that is provided by the Data Access Layer 1820 (e.g., Input Data Control Block 1826).

Code executors include loadable core service extensions (e.g., Extensibility Service 1842) responsible for running data programs (e.g., user-provided code) inside a data platform system. Code executors can extend a core service extensibility interface (e.g., Extensibility Service 1842) by implementing functions such as creating an instance of a data program function (e.g., "createServiceInstance"), executing an instance of a data program function (e.g., "executeServiceInstance"), and destroying an instance of a data program function ("destroyServiceInstance"). As an example, the createServiceInstance function can be called once per instance of a code execution. This function allows code executor(s) to perform initialization tasks. The executeServiceInstance function can be called multiple times by Core Service 1840. This function provides a data control block with a batch of input rows. This function can return a data control block with a batch of output rows. The destroyServiceInstance function is called when the Core Service 1840 has no more input data for an instance of a data program. This function allows this instance of the data program to finalize its execution.

As an example, when a request for code execution arrives at the Core Service 1840, Core Service 1840 loads the Code Executor 1850 extension, creates one or more code executor instance(s) 1852, and starts execution of the instance(s) 1852. The Core Service 1840 calls into the Code Executor 1850's execute function passing a data control block (e.g., Input Data Control Block 1826) containing a batch of input rows to process and a data control block for the code executor to write the batch of output rows (e.g., into Output Data Control Block 1828). This process can be repeated until all batches of input rows are processed.

In one or more embodiments the In-Database Processes 1830 comprise an instance 1852 of a data program for execution by Code Executor 1850 temporarily (e.g., for a usage period). Output data represented by Batch of Output Rows 1824 can be generated during the usage period. When the output data is complete, the Core Service 1840 can destroy the instance 1852 by ending the usage period such that the In-Database Processes 1830 no longer comprise the instance 1852. For instance, the In-Database Processes 1940 can end the usage period by one or more of removing the computer instructions or removing addressing of the computer instructions. One of ordinary skill in the art will appreciate other methods for destroying computer program instructions than those explicitly expressed herein.

Core Service 1840 can provide other services for processing input information such as a Metadata Service 1844 for providing metadata relevant to executing code in Code Executor 1850 and I/O Service 1846 useful for inputting and outputting data to Code Executor 1850.

Figure 19:
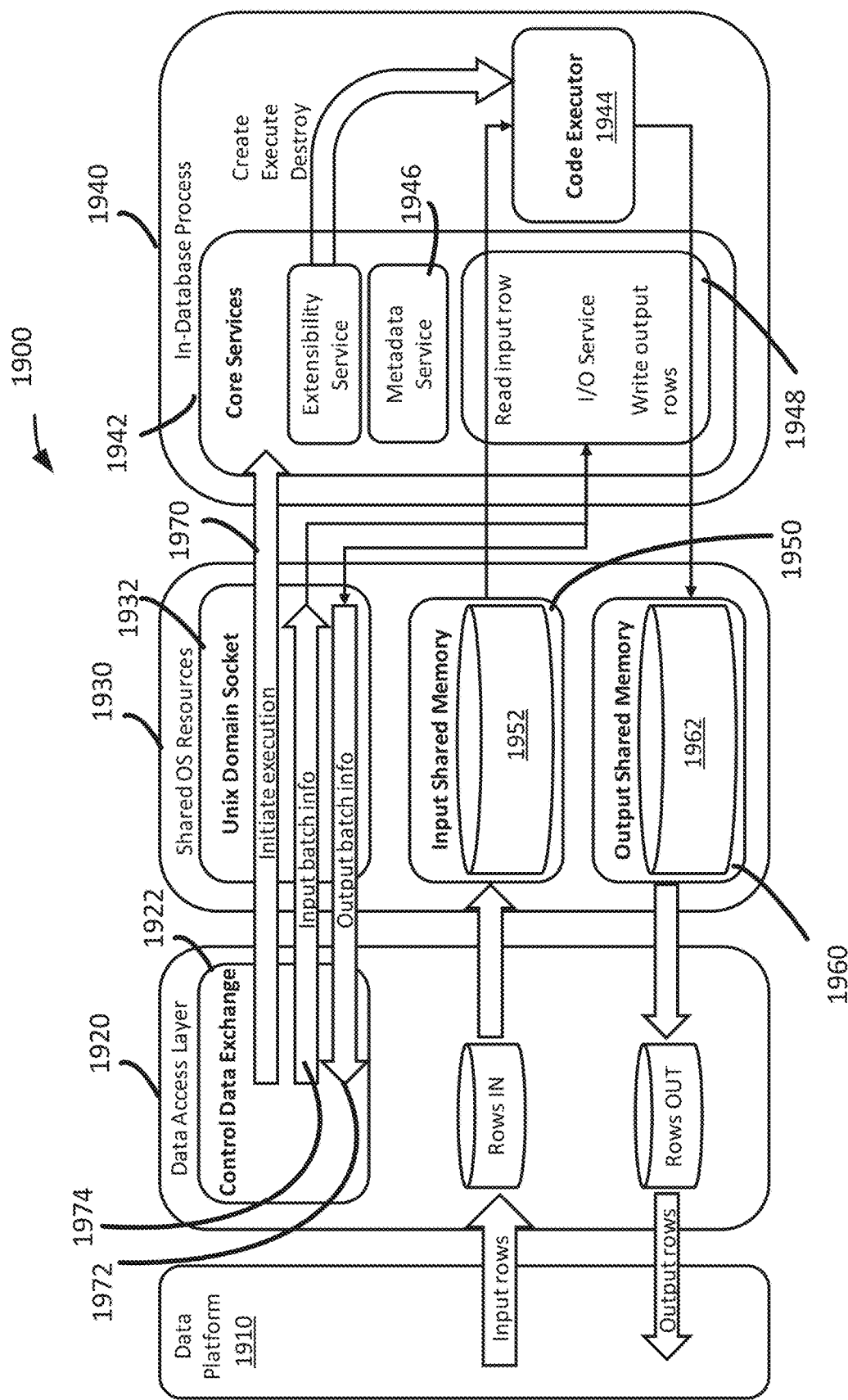
FIG. 19 illustrates a system comprising a control data exchange entity for executing code executors according to at least one embodiment of the present technology.

FIG. 19 illustrates a system 1900 comprising a data exchange entity (Control Data Exchange Entity 1922) for executing code executor(s) (e.g., Code Executor 1944). The system 1900 is a data management system with a Data Platform 1910 comprising a layer for data storage such as a database. In this example, the Data Access Layer 1920 (e.g., a vendor data access layer) initiates a handshake with a service entity (Core Services Entity 1942) through Control Data Exchange Entity 1922. The Control Data Exchange Entity 1922 can use a Unix Domain Socket 1932 in Shared Operating System (OS) Resources 1930 to communicate with the Core Services Entity 1942 (e.g., communication information such as the availability of input or output data or the end of input data or end of output data exchange). Other communication techniques could have been used such as other types of sockets, shared memory segments, semaphores, signals, etc. for Shared OS Resources 1930.

During handshake the Data Access Layer 1920 can alternatively, or additionally provide information about where to find metadata (e.g., for Metadata Service 1946) that is useful for executing code. The Core Services Entity 1942 can read the metadata (e.g., from a metadata table), create one or more instances of the Code Executor 1944, and put a data program of the Code Executor 1944 into execution. The Code Executor 1944 can use an In and Out (I/O) Service 1948, provided by the Core Services Entity 1942, to read and write data from and/or to the Data Platform 1910.

A data exchange entity (e.g., Control Data Exchange Entity 1922) can send execution commands to a service entity (e.g., Core Services Entity 1942). An execution command can indicate to execute an instance of a data program (e.g., Initiate Execution message 1970). The execution command can initiate operations to provide the instance of the data program with the input data in a data format specific to the data program. A service entity (e.g., Core Services Entity 1942) can, responsive to the execution command, create an instance of a data program by storing the computer instructions in memory for the In-Database Processes 1940 (e.g., in a memory portion for the data management system supporting the in-database processes).

For example, a memory location can be assigned for storing computer instructions in the system 1900. The computer instructions can be based on an external data program of an external computing system (not shown) external to system 1900. For example, stored computer instructions can comprise a copy of computer instructions of the external data program in the same computer language of the external data program. FIGS. 14 and 16 described in more detail external computing systems. The system 1900 can store the computer instructions based on the external data program of an external computing system. A service entity can execute an instance of a data program by executing the computer instructions stored for the in-database process(es) (e.g., In-Database Process 1940).

In one or more embodiments, an execution command indicates, based on metadata (e.g., stored according to Metadata Service 1946), for a service entity (e.g., Core Services Entity 1942) to create a data program instance to process input data (e.g., into Input Data Control Block 1952) that is made available by the Data Access Layer 1920 (e.g., using Unix Domain Socket 1932). After computation is applied to the input data by the data program instance, the data program instance returns the output data (e.g., into Output Data Control Block 1962).

In one or more embodiments, the Control Data Exchange 1922 provides Input Batch Information 1974 to indicate the availability of input data to the Core Services Entity 1942 (e.g., a location for input data, an amount or length of input data, etc.). In response, the Data Access Layer 1920 can start receiving data from the Data Platform 1910 (e.g., from a database) and serializes the received data into an Input Data Control Block 1952 (e.g., as an input batch of rows). A data control block can be stored in shared memory objects (e.g., Input Shared Memory 1950 or Output Shared Memory 1960) that can be accessed by the Core Services Entity 1942 and the Code Executor(s) 1944. This data can be specific to the program executed by Code Executor 1944. This enables the data format specific to an executed program to be in a different format than data stored in the data platform 1910 that can be in a format specific to the system 1900.

When a batch of input rows is ready for consumption, the Data Access Layer 1920 can send to the I/O Service 1948 information pertaining to the input data information (e.g., data length, number of rows, etc.). This information can indicate the availability of data. The Code Executor 1944 start processing the input rows. After processing the data, the Code Executor 1944 can produce output rows and write them to Output Data Control Block 1962 (e.g., an output batch of rows). When output data is available (e.g., a batch of output rows is ready), the I/O Service 1948 sends the output data information (data length, number of rows, etc.) to the Data Access Layer 1920. The Data Access Layer 1920 reads the data (e.g., from the Output Data Control Block 1962 and sends the data to the Data Platform 1910 (e.g., for database storage). This process can repeat (e.g., until all input data is processed and all the output data is given by the Code Executor 1944). At the end of the process, the Data Platform 1910 can collect all output data partitions (e.g., in a database table). In one or more embodiments, the Core Services Entity 1942 provides Output Batch Information 1972 to indicate the availability of output data to the Control Data Exchange 1922 (e.g., a location for output data, an amount of output data, etc.).

Input data, output data, and metadata for executing the instance of the first data program can be stored in a database table or file in the system 1900 (e.g., depending on the type of the data platform 1910). In one or more embodiments, there can be multiple batches of the input data. The Core Services Entity 1942 can execute multiple batches of the input data by an instance of a data program of Code Executor 1944 before destroying the instance.

FIG. 20 illustrates client node computer instructions, input data, and output data. The following computer instructions are an example for executing a SAS® DATA STEP™ program inside a relational database. One of ordinary skill in the art will understand that computer instructions could be written for a different type of program and/or for a different type of data management system.

In one or more embodiments, a computing system could cause the execution of the computer instructions 2000 shown in FIG. 20A (e.g., responsive to a user request of the external computing system). The computer instructions indicate to read input data from a database table called sampletable1, process the input data and write output data to another database table called sampleTableOut.

FIG. 20B shows a sampletable1 table description. The input identities are defined according to column 2031 with data type according to type 2032. FIG. 20C shows an example sampleTableOut description. For instance, a "marital" input variable according to the computer instructions 2000 can be of data values "0" or "1" in a data element storage for data of type "double" which allows for storing 64 bits of information. The output identities are defined according to column 2061 with data type according to type 2062. For example, a "marital 2" output variable according to the computer instructions 2000 can be stored in a data storage for data of type "char(8)" represented by up to 8 characters (e.g., "single", "married", "unknown"). Other data types shown include data types according to a "varchar(32)", which is a variable character field holding 32 characters, and "decimal(8,1)" holding data representing decimals. One of ordinary skill in the art will appreciate that programs could relate to other data types than those explicitly shown here.

In one or more embodiments, if the input data according to FIG. 20B is in a data management system remote or separately operated from a computing system executing the computer instructions 2000, rather than move data to the computing system, an extension can be made to the data management system for execution where the data is. For instance, in this example of FIG. 20A, a DSACCEL option is enabled, and the computing system executing "options dsaccel='any'" will allow relevant computing instructions of the computer instructions 2000 to be executed inside the data management system holding the data (e.g., in a database). For instance, a client interface is called to dispatch a program to the database (e.g., a SAS® In-Database client interface). In this way an instance of computer instructions based on computer instructions 2000 can be stored in the data management system for executions there. An instance of a computer function can also be referred to as a function.

FIGS. 21A-F illustrate data system computer instructions for executing a data program in a data management system that is based on a data program in an external system. In this example, to run the computer instructions 2000 from FIG. 20A inside the database, the client interface: creates a database user defined table function, produces JSON string containing information to execute a program instance, and generates a SQL statement that executes the user defined function.

FIG. 21A shows example computer instructions 2100 for a function definition. In this example, the function definition depends on the input table columns and output columns according to the computer instructions 2000 in FIG. 20A. A unique function name is defined unique from existing function names as shown in FIG. 21A. The input table columns "c2", "frequent", and "marital" are the arguments passed to the new function. The function returns a table containing columns "marital2", "c3", "frequent2", and "frequent3". Computer instructions can also be used to load any libraries that can contain relevant information for executing a program. For instance, computer instructions 2100 call "SAS_Embedded_Process_Library".

FIGS. 21B-21C show example metadata 2110 and metadata 2130 produced. A computing system described herein (e.g., a service entity) can be used to retrieve metadata for executing instance(s) of a data program (e.g., by retrieving a JSON string). The metadata can be program-specific. The computing system can delete the metadata following execution of the instance(s) of a program. The metadata in these examples together form a JSON string but other formats could have been used. The metadata in this example is stored in a database table. On other data platforms, the metadata can be written to a file. The metadata is accessible by the user defined function during execution run time. In this example, each execution of a computer instance in the database will have its own function definition and metadata. The metadata can be deleted from the metadata table after function execution.

In this example, the metadata 2110 specifies a location for metadata (e.g., "metaTable Name": "sasepv5"). The metadata 2110 in this example also specifies a location and data type for input data (e.g., specifying a database where "marital" data can be found of sql type 7 and length 8). The metadata 2110 and 2130 also specifies a location and data type for output data (e.g., specifying an output variable "marital2").

FIG. 21D shows an example metadata table description. Column identities are defined in Column 2141, and their types are defined in type column 2142. For instance, Column "job" stores the JSON string of data type "JSON". Column "id" can be used by a service entity described herein (e.g., a core services entity) to retrieve metadata for a particular function execution, and can use 32 characters with a data type "char(32)". For instance, "id" can be a unique identifier for a function and can serve as an identifier and key. Column "ts" is the date and time the metadata was created, and the column has a data type of "timestamp".

Since the function name is unique, the function name can be used as metadata identifier. Alternatively, or additionally, the metadata identifier can be passed as part of the function input arguments. Depending on the data platform or implementation an identifier can be retrieved from the metadata table (e.g., "_SASID_"). A unique identifier can be formed by combining different fields. For example, a "program" field of a unique identifier is the code that is executed inside a code executor. A "serviceImplementation" field of the unique identifier indicates which code executor is used to run the program.

FIG. 21E shows an example of computer instructions 2150 for passing function input arguments. As shown the input and output columns with their respective data types is described (e.g., output column "marital 2" of "char(8)"). One or more libraries can also be used for providing information pertaining to a function (e.g., SAS_EMBEDDED_PROCESS_LIBARY).

FIG. 21F shows an example of computer instructions 2160 for executing a function and producing an output table (e.g., an in-database client interface generates a SQL statement once a user defined function and metadata are created). The computer instructions 2160 can then be submitted to a data management system for execution there (e.g., in database).

In this way a database can now call a function (e.g., the sasDataStepFunction123 function described in with reference to FIGS. 21A-F) and a Data Access Layer (e.g., a vendor data access layer, VDAL) entity or component can be activated (e.g., a data access layer described with respect to FIGS. 17-19 and 22-23). Accordingly, an access layer herein can be selectively activated by a computing system (e.g., responsive to receipt or calling of data programs).

Figure 22:
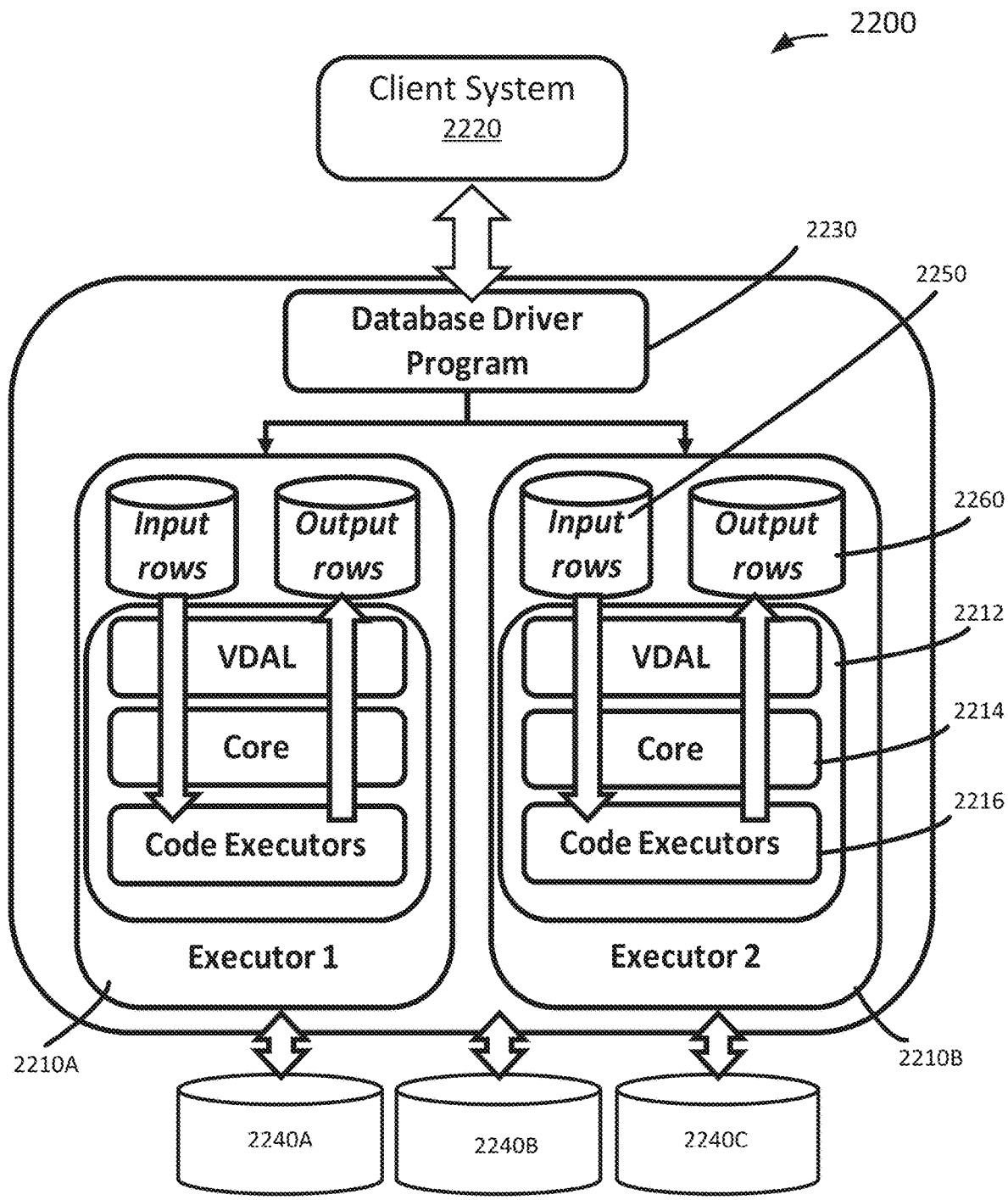
FIG. 22 illustrates a system for parallel code executor processes according to at least one embodiment of the present technology.

One or more embodiments are applicable to programs that call for parallel processing. FIG. 22 illustrates an example system for parallel code executor processes. In this instance, a client system 2220 (e.g., a client system comprising a client node 1610 described in more detail with respect to FIG. 16) can instruct a database drive program 2230 to create multiple executors for running instances representing aspects of one or more data programs. The data programs can be from an external system set up in the data management system. A computing system can execute a data program using parallel processing by creating multiple instances and executing the computer instructions of each of the multiple instances.

In the example in FIG. 22, multiple executors (e.g., executor 2210) are set up for handing separate parts of a task of one or more data programs. Each executor (e.g., Executor 2210) includes a Vendor Data Access Layer (e.g., VDAL 2212), Core (e.g., Core 2214), and Code Executors (e.g., Code Executors 2216). Vendor Data Access Layer is a type of data access layer as described herein. The Vendor Data Access Layer is database specific. Vendor Data Access Layer is the unique point of contact with the database(s) 2240. Three databases 2240 are shown merely for example.

More or less databases could be used. It hides all data access complexity by providing a common serialization application programing interface (API) to read and write data (e.g., data in input rows 2250 and output rows 2260). In this example, the Core 2214 is a service entity controlling code executor execution. The Core 2214 facilities access to function metadata and data. Core 2214 is database-agnostic, allowing portability. Code Executors include user-written functions that comply with the Core Service programming model. Code Executors are portable and database-agnostic.

Figure 23:
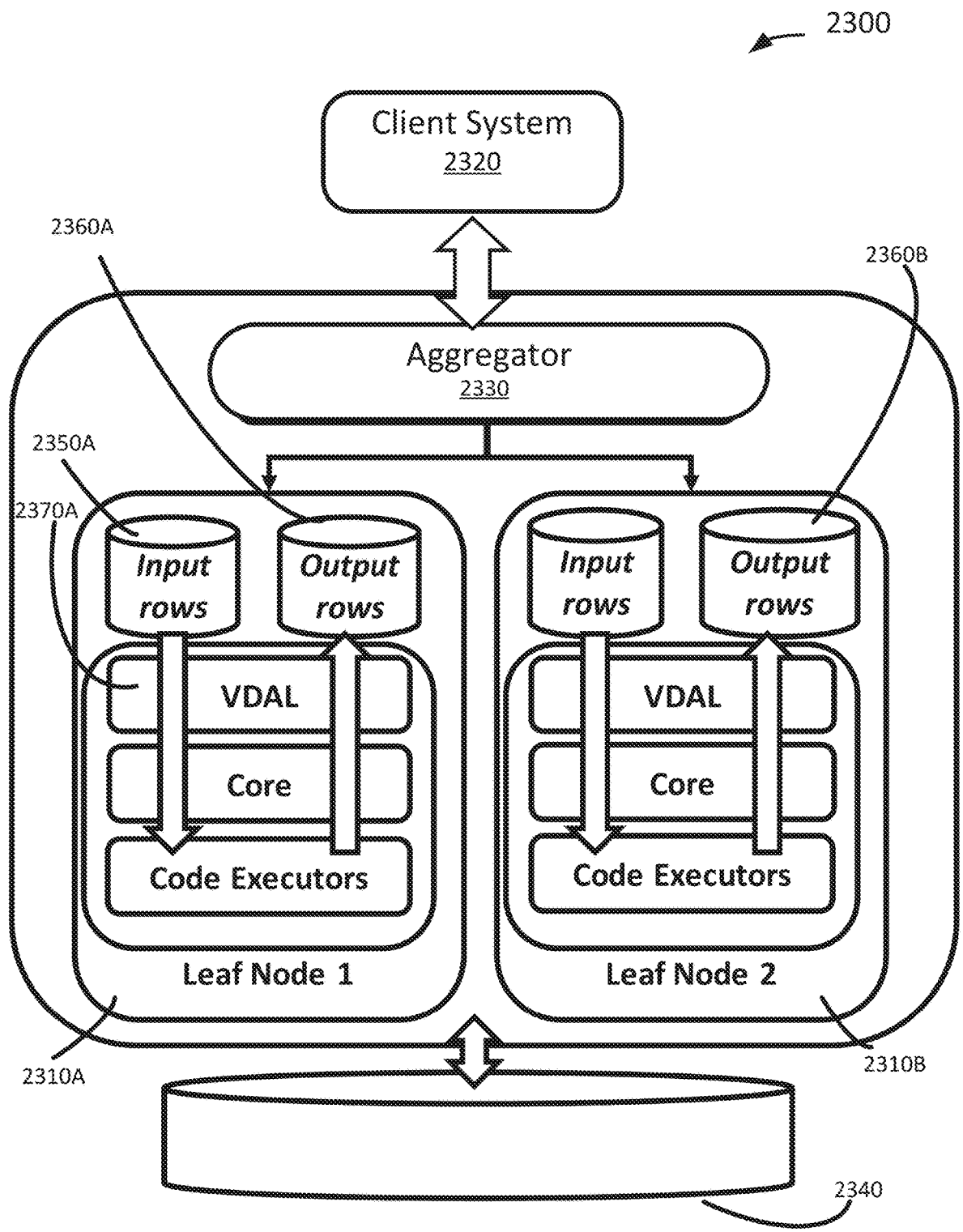
FIG. 23 illustrates a system for parallel processing for executing a data program according to at least one embodiment of the present technology.

In one or more embodiments, executors can be set up for parallel processing of different parts of data. FIG. 23 illustrates a system 2300 for parallel processing of data during executing a data program. For example, the data program could call for parallel processing of input data. A client system 2320 (e.g., a client system 2220) can instruct an Aggregator 2330 (e.g., a SQL external function on aggregator) to separate data for multiple instances where each instance is representing a data program from an external system in the data management system. A computing system can execute the data program using parallel processing by creating multiple instances of the data program and executing the computer instructions of each of the multiple instances on different data elements of the input data. For instance, multiple leaf node executors (e.g., Leaf Node 2310) can be set up for handing separate data (e.g., input rows 2350A is processed by Leaf Node 1).

A core can process multiple batches of rows in parallel. Each parallel execution unit can create its own instance of a code executor (e.g., Leaf Node 2310A and Leaf Node 2310B). Parallel code executor instances do not need to share data between themselves. Each code executor (e.g., Leaf Node 2310A and Leaf Node 23101B) instance operates as a single unit of work. For instance, the leaf node executors in this example each have code executor(s), core service(s) and vendor data access layers (VDAL) as described herein such that they can operate as independent executor units. The output data collected from all instances of the code executors can be sent back to the data platform through respective data access layers (e.g., vendor data access layer 2370A). The Aggregator 2330 can be used to combine the output from each code executor (e.g., output rows 2360A and output rows 2360B). Output can be stored in one or more databases 2340.

Embodiments herein extend traditional database user-defined functions and provide architecture for portable user-written functions. This new In-Database Architecture can be applied, for example, to relational database management software (RDBMS) and parallel execution platforms, such as APACHE SPARK™. For instance, execution can be initiated by a run time definition and execution of a database user defined function or by generating Scala/PYTHON® code on APACHE SPARK™ platform.

Modern data platform systems such as RDBMS APACHE SPARK™ are equipped with an additional layer of software that allows data computations to be executed on the computing systems where the data is stored. One or more embodiments move data program computation to the system where the data lives. Even with this additional layer, implementing external data programs is difficult because every data platform system implementation provides their own way of allowing computations. For instance, RBDMS allows direct computation on data through interfaces called User Defined Function (UDF), or Stored Procedures (SP). Those interfaces are common on all RDBMS, but the implementation is very much dependent on the RDBMS vendor. Usually, UDF and SP are not seamlessly portable. On parallel execution frameworks, such as Apache Spark, users can provide their own computation by implementing APACHE SPARK™ functions that run either as transformations or actions on Spark datasets.

Traditional methods of having computations where the data lives involved costly development programs to develop programs to operate on different data platforms (e.g., SQL-based and parallel execution platforms such as Map Reduce and APACHE SPARK™). For example, SAS® In-Database Technologies is a collection of SAS® products for execution inside the database system. Examples of such SAS® products are Scoring Accelerator, Code Accelerator, and Data Quality Accelerator. The SAS® Embedded Process (SAS/EP) is used by SAS® In-Database products to integrate into database systems. SAS® has developed multiple SAS/EP based on execution of DS2 code. Each one of those SAS/EP targets a specific data platform. However, all of them with the same goal: to provide an execution environment for SAS® DS2 code. One or more embodiments allow the parallel execution of SAS® code inside the data platform system without having to do this data platform specific integration.

Embodiments improve on these approaches by providing a new portable and extensible architecture. Embodiments herein can be considered a portable architecture because the architecture can be implemented and executed on any data platform system (i.e., without having to develop a specific data program for the data platform system). Embodiments herein can be considered an extensible architecture because the architecture can allow the execution of different computer instructions or codes inside the data platform. Such execution can even include execution of data programs that call for parallel execution of data or multiple tasks performed in parallel.

What is claimed is:

1. A computer-program product tangibly embodied in a non-transitory machine-readable storage medium, the computer-program product including instructions operable to cause a first computing system, comprising a service entity, to:

receive, at the service entity, from a data exchange entity, an execution command indicating for the service entity to store an instance of a first data program in a first memory portion of the first computing system,
wherein an access layer of the first computing system comprises the data exchange entity;
wherein the access layer provides access for in-database processes to retrieve input data stored in a second memory portion of the first computing system and store output data to a third memory portion of the first computing system;
wherein the in-database processes comprise processes of the service entity;
wherein the processes of the service entity are configured to store the instance of the first data program by storing, in the first memory portion of the first computing system, computer instructions based on an external data program of an external computing system external to the first computing system;

receive, at the service entity, from the data exchange entity, an indication of availability of the input data stored in the second memory portion, wherein the input data is available for use by the instance of the first data program; and send, from the service entity, to the data exchange entity, an indication of availability of the output data stored in the third memory portion of the first computing system, wherein the output data is generated based on execution of the instance of the first data program.

2. The computer-program product of claim 1,
wherein the input data is stored according to a file or database management system of the first computing system; and
wherein the first computing system accesses the input data using a different computer language than the computer instructions of the instance of the first data program.

3. The computer-program product of claim 1, wherein the instructions are operable to cause the service entity to, responsive to the execution command, create the instance of the first data program by:
assigning a memory location in the first memory portion of the first computing system for storing the computer instructions based on the external data program of an external computing system;
receiving, from the external computing system, the computer instructions based on the external data program of an external computing system; and
storing the computer instructions based on the external data program of an external computing system.

4. The computer-program product of claim 1, wherein the instructions are operable to cause the service entity to, responsive to the execution command, execute the instance of the first data program by executing the computer instructions stored in the first memory portion of the first computing system.

5. The computer-program product of claim 1,
wherein the in-database processes comprise the instance of the first data program for a usage period when the instance of the first data program is stored in the first memory portion of the first computing system;
wherein the output data is generated based on execution of the instance of the first data program during the usage period;
wherein the instructions are operable to cause the service entity to, responsive to executing the input data by the first data program, destroy the instance of the first data program by ending the usage period such that the in-database processes no longer comprise the instance of the first data program; and
wherein the ending the usage period comprises one or more of:
removing the computer instructions from the first memory portion of the first computing system; and
removing addressing of the computer instructions in the first memory portion of the first computing system.

6. The computer-program product of claim 1,
wherein the indication of the availability of the input data indicates multiple batches of the input data; and
wherein the instructions are operable to cause the service entity to execute the multiple batches of the input data by the instance of the first data program before destroying the instance of the first data program.

7. The computer-program product of claim 1,
wherein the execution command further indicates for the service entity to execute the instance of the first data program by providing the instance of the first data program with the input data in a data format specific to the first data program; and
wherein the data format specific to the instance of the first data program is in a format different than the input data stored in the second memory portion, which is specific to the first computing system.

8. The computer-program product of claim 1, wherein the instructions are operable to cause the service entity to retrieve first data program-specific metadata identifying to the instance of the first data program:
a location and data type for the input data; and
a location and data type for the output data.

9. The computer-program product of claim 1, wherein the indication of the availability of input data comprises a data length or number of rows for the input data.

10. The computer-program product of claim 1, wherein the access layer is selectively activated by the first computing system.

11. The computer-program product of claim 1, wherein the input data, the output data, and metadata for executing the instance of the first data program is stored in a database table or file in the first computing system.

12. The computer-program product of claim 1,
wherein the first computing system comprises multiple databases accessible via the access layer such that the multiple databases can be searched individually or collectively for availability of the input data; and
wherein one or more of the multiple databases are for use by at least one of the in-database processes.

13. The computer-program product of claim 1, wherein the instructions are operable to cause the service entity to receive the indication of the availability of input data, and send the indication of the availability of output data, by using a socket, shared memory segments, or a semaphore.

14. The computer-program product of claim 1, wherein the instructions are operable to cause the first computing system to execute the first data program using parallel processing by:
creating multiple instances of the first data program; and
executing the computer instructions of each of the multiple instances on different data elements of the input data.

15. The computer-program product of claim 1, wherein the instance of the first data program is for machine learning actions, analytics computations, or model scoring.

16. The computer-program product of claim 1, wherein the instructions are operable to cause the service entity to:
retrieve metadata for executing the instance of the first data program in a JSON string; and
delete the metadata following execution of the instance of the first data program.

17. A computer-implemented method comprising:
receiving, at a service entity, from a data exchange entity, an execution command indicating for the service entity to store an instance of a first data program in a first memory portion of a first computing system,
wherein an access layer of the first computing system comprises the data exchange entity;
wherein the access layer provides access for in-database processes to retrieve input data stored in a second memory portion of the first computing system and store output data to a third memory portion of the first computing system;
wherein the in-database processes comprise processes of the service entity;
wherein the processes of the service entity are configured to store the instance of the first data program by storing, in the first memory portion of the first computing system, computer instructions based on an external data program of an external computing system external to the first computing system;
receiving, at the service entity, from the data exchange entity, an indication of availability of the input data stored in the second memory portion, wherein the input data is available for use by the instance of the first data program; and sending, from the service entity, to the data exchange entity, an indication of availability of the output data stored in the third memory portion of the first computing system, wherein the output data is generated based on execution of the instance of the first data program.

18. The computer-implemented method of claim 17, wherein the input data is stored according to a file or database management system of the first computing system; and wherein the first computing system accesses the input data using a different computer language than the computer instructions of the instance of the first data program.

19. The computer-implemented method of claim 17, wherein the in-database processes comprise the instance of the first data program for a usage period when the instance of the first data program is stored in the first memory portion of the first computing system;

wherein the output data is generated based on execution of the instance of the first data program during the usage period;

wherein the computer-implemented method comprises, responsive to executing the input data by the first data program, destroying the instance of the first data program by ending the usage period such that the in-database processes no longer comprise the instance of the first data program; and wherein the ending the usage period comprises one or more of:

removing the computer instructions from the first memory portion of the first computing system; and removing addressing of the computer instructions in the first memory portion of the first computing system.

20. The computer-implemented method of claim 17, wherein the indication of the availability of the input data indicates multiple batches of the input data; and wherein the computer-implemented method comprises executing the multiple batches of the input data by the instance of the first data program before destroying the instance of the first data program.

21. The computer-implemented method of claim 17, wherein the execution command further indicates for the service entity to execute the instance of the first data program by providing the instance of the first data program with the input data in a data format specific to the first data program; and wherein the data format specific to the instance of the first data program is in a format different than the input data stored in the second memory portion, which is specific to the first computing system.

22. The computer-implemented method of claim 17, comprises retrieving first data program-specific metadata identifying to the instance of the first data program:

a location and data type for the input data; and a location and data type for the output data.

23. The computer-implemented method of claim 17, wherein the indication of the availability of input data comprises a data length or number of rows for the input data.

24. The computer-implemented method of claim 17, wherein the access layer is selectively activated by the first computing system.

25. The computer-implemented method of claim 17, wherein the first computing system comprises multiple databases accessible via the access layer such that the multiple databases can be searched individually or collectively for availability of the input data; and wherein one or more of the multiple databases are for use by at least one of the in-database processes.

26. The computer-implemented method of claim 17, comprises receiving the indication of the availability of input data, and sending the indication of the availability of output data, by using a socket, shared memory segments, or a semaphore.

27. The computer-implemented method of claim 17, comprising executing the first data program using parallel processing by:

creating multiple instances of the first data program; and executing the computer instructions of each of the multiple instances on different data elements of the input data.

28. The computer-implemented method of claim 17, comprising:

retrieving metadata for executing the instance of the first data program in a JSON string; and deleting the metadata following execution of the instance of the first data program.

29. A first computing system comprising processor and memory, the memory containing instructions executable by the processor wherein the first computing system is configured to:

receive, at a service entity, from a data exchange entity, an execution command indicating for the service entity to store an instance of a first data program in a first memory portion of the first computing system, wherein an access layer of the first computing system comprises the data exchange entity;

wherein the access layer provides access for in-database processes to retrieve input data stored in a second memory portion of the first computing system and store output data to a third memory portion of the first computing system;

wherein the in-database processes comprise processes of the service entity;

wherein the processes of the service entity are configured to store the instance of the first data program by storing, in the first memory portion of the first computing system, computer instructions based on an external data program of an external computing system external to the first computing system, wherein the external computing system does not comprise the processor and memory of the first computing system;

receive, at the service entity, from the data exchange entity, an indication of availability of the input data stored in the second memory portion, wherein the input data is available for use by the instance of the first data program; and send, from the service entity, to the data exchange entity, an indication of availability of the output data stored in the third memory portion of the first computing system, wherein the output data is generated based on execution of the instance of the first data program.

30. A computer-program product tangibly embodied in a non-transitory machine-readable storage medium, the computer-program product including instructions operable to cause a first computing system, comprising a data exchange entity, to:

send, from the data exchange entity, to a service entity, an execution command indicating for the service entity to store an instance of a first data program in a first memory portion of a first computing system of the first computing system,
  wherein an access layer of the first computing system comprises the data exchange entity;
  wherein the access layer provides access for in-database processes to retrieve input data stored in a second memory portion of the first computing system and store output data to a third memory portion of the first computing system;
  wherein the in-database processes comprise processes of the service entity;
  wherein the processes of the service entity are configured to store the instance of the first data program by storing, in the first memory portion of the first computing system, computer instructions based on an external data program of an external computing system external to the first computing system;
send, from the data exchange entity, to a service entity, an indication of availability of the input data stored in the second memory portion, wherein the input data is available for use by the instance of the first data program stored on the first computing system; and
receive, at the data exchange entity, from the service entity, an indication of availability of the output data stored in the third memory portion of the first computing system, wherein the output data is generated based on execution of the instance of the first data program.

31. The computer-program product of claim 30, wherein the indication of the availability of input data comprises a data length or number of rows for the input data.

32. The computer-program product of claim 30, wherein the access layer is selectively activated by the first computing system.

33. The computer-program product of claim 30,
  wherein the first computing system comprises multiple databases accessible via the access layer such that the multiple databases can be searched individually or collectively for availability of the input data; and
  wherein one or more of the multiple databases are for use by at least one of the in-database processes.

* * * * *